US011863996B2

(12) United States Patent
Ford et al.

(10) Patent No.: US 11,863,996 B2
(45) Date of Patent: Jan. 2, 2024

(54) CENTRALIZED COORDINATION FOR SHARED SPECTRUM SYSTEMS

(71) Applicant: Samsung Electronics Co., Ltd., Suwon-si (KR)

(72) Inventors: Russell Ford, San Jose, CA (US); Jeongho Jeon, San Jose, CA (US); Joonyoung Cho, Portland, OR (US); Vishnu Vardhan Ratnam, Plano, TX (US); Matthew Tonnemacher, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/807,907

(22) Filed: Mar. 3, 2020

(65) Prior Publication Data
US 2020/0288324 A1   Sep. 10, 2020

Related U.S. Application Data

(60) Provisional application No. 62/815,777, filed on Mar. 8, 2019.

(51) Int. Cl.
*H04W 16/14*   (2009.01)
*H04W 16/10*   (2009.01)
*H04W 24/10*   (2009.01)

(52) U.S. Cl.
CPC .......... *H04W 16/14* (2013.01); *H04W 16/10* (2013.01); *H04W 24/10* (2013.01)

(58) Field of Classification Search
CPC ... H04W 24/10; H04W 72/042; H04W 72/04; H04W 76/27; H04W 72/0446;
(Continued)

(56) References Cited

U.S. PATENT DOCUMENTS 7,924,794 B2 *   4/2011   Ballarini ................. H04W 8/02
                                                                370/338
8,140,018 B2 *   3/2012   Abedi .................... H04W 16/14
                                                                455/63.1
(Continued)

FOREIGN PATENT DOCUMENTS

WO     2016195751 A1    12/2016
WO  WO-2017190294 A1 *  11/2017   ......... H04L 27/2636

OTHER PUBLICATIONS

"Release 1 Technical Webinar", CBRS Alliance, May 30, 2018, 30 pages.
(Continued)

*Primary Examiner* — Srilakshmi K Kumar
*Assistant Examiner* — Jing Gao

(57) ABSTRACT

An electronic device, a base station, and a method for managing a shared spectrum. The electronic device includes a processor configured to cause the electronic device to obtain coexistence measurement reports (CMRs) from the plurality of BSs; identify interference relationships among the plurality of BSs based on the CMRs; assign a set of BSs to one or more basic allocation units (BAUs) in a plurality of BAUs based on the interference relationships; and transmit a spectrum access grant (SAG) to the set of BSs, wherein the SAG includes BAU assignments for the set of BSs. Each BAU in the plurality of BAUs is a time/frequency unit and the set of BSs includes a primary BS and a secondary BS. The secondary BS can transmit in the one or more BAUs when a transmission of the secondary BS does not interfere with a transmission of the primary BS.

20 Claims, 16 Drawing Sheets

(58) Field of Classification Search
CPC ......... H04W 72/0413; H04W 74/0833; H04W 16/14; H04W 72/0453; H04W 74/0808; H04W 80/02; H04W 72/0406; H04W 76/11; H04W 88/06; H04W 24/02; H04W 72/14; H04W 52/40; H04W 72/02; H04W 72/044; H04W 72/082; H04W 72/12; H04W 72/1257; H04W 76/15; H04W 28/16; H04W 36/0055; H04W 48/10; H04W 52/281; H04W 52/346; H04W 72/005; H04W 72/0426; H04W 72/0493; H04W 72/121; H04W 72/1226; H04W 72/1247; H04W 74/0816; H04W 76/12; H04W 76/32; H04W 12/0013; H04W 28/0226; H04W 28/08; H04W 28/18; H04W 4/08; H04W 52/28; H04W 72/10; H04W 72/1215; H04W 74/002; H04W 16/10

See application file for complete search history.

(56) References Cited

U.S. PATENT DOCUMENTS

| | | | |
|---|---|---|---|
| 8,787,926 | B2 | 7/2014 | Mody |
| 9,591,644 | B2 | 3/2017 | Chen et al. |
| 9,756,529 | B2 | 9/2017 | Buddhikot et al. |
| 9,801,147 | B2 | 10/2017 | Patel et al. |
| 9,992,780 | B2 | 6/2018 | Gauvreau et al. |
| 10,122,480 | B2 * | 11/2018 | Kim ................... H04L 5/0048 |
| 2011/0125905 | A1 | 5/2011 | Baucke et al. |
| 2015/0131536 | A1 * | 5/2015 | Kaur ................... H04L 5/0055 370/329 |
| 2015/0289141 | A1 | 10/2015 | Ghasemzadeh et al. |
| 2016/0119882 | A1 * | 4/2016 | Liu ................... H04W 52/244 455/422.1 |
| 2017/0034847 | A1 * | 2/2017 | He ................... H04W 74/06 |
| 2018/0227838 | A1 * | 8/2018 | Hayashi ............. H04W 72/042 |
| 2018/0317093 | A1 * | 11/2018 | Li ................... H04W 28/16 |

OTHER PUBLICATIONS

"CBRS Coexistence Technical Specifications", CBRSA-TS-2001, Cbrs Alliance, V2.0.0, Jan. 6, 2019, 27 pages.

"5 GHz RLAN; Harmonised Standard covering the essential requirements of article 3.2 of Directive 2014/53/EU", ETSI EN 301 893 V2.0.7, Nov. 2016, 123 pages.

"Order on Reconsideration and Second Report and Order", Federal Communications Commission, FCC 16-55, May 2, 2016, 123 pages.

"Report and Order and Further Notice of Proposed Rulemaking", Federal Communications Commission, FCC 16-89, Jul. 14, 2016, 278 pages.

"What can we do with 5G NR Spectrum Sharing that isn't possible today?", Qualcomm Technologies, Inc., Dec. 13, 2017, 33 pages.

Paul, Utpal, et al., "Understanding Traffic Dynamics in Cellular Data Networks", IEEE INFOCOM 2011, pp. 882-890.

Xu, Fengli, et al., "Understanding Mobile Traffic Patterns of Large Scale Cellular Towers in Urban Environment", IEEE/ACM Transactions on Networking, Apr. 2017, vol. 25, No. 2, pp. 1147-1161.

International Search Report and Written Opinion of the International Searching Authority in connection with International Application No. PCT/KR2020/003271 dated Jun. 16, 2020, 10 pages.

Extended European Search Report dated Nov. 3, 2023 regarding Application No. 20769452.2, 11 pages.

* cited by examiner

CENTRALIZED COORDINATION FOR SHARED SPECTRUM SYSTEMS

CROSS-REFERENCE TO RELATED APPLICATION AND CLAIM OF PRIORITY

This application claims priority under 35 U.S.C. § 119(e) to U.S. Provisional Patent Application No. 62/815,777 filed on Mar. 8, 2019. The above-identified provisional patent application is hereby incorporated by reference in its entirety.

TECHNICAL FIELD

The present disclosure relates generally to wireless communication systems, and more specifically, to centralized coordination for shared spectrum systems.

BACKGROUND

A communication system includes a downlink (DL) that conveys signals from transmission points, such as base stations (BSs), to reception points, such as user equipments (UEs). The communication system also includes an uplink (UL) that conveys signals from transmission points, such as UEs, to reception points, such as BSs.

Increasing the deployment density of BSs is a way to increase data throughput, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

Another way of increasing data throughput in the United States involves the opening of unlicensed or shared spectrums. For example, 3.55-3.7 GHz Citizens Broadband Radio Service (CBRS) band has a unique three-tiered, hierarchical access model, which includes incumbent (Federal user, Fixed Satellite Service), priority access licensees (PALs), and general authorized access (GAA) in descending order of priority. In another example, 5925-7125 MHz band and 5925-6425 MHz band are under consideration in United States and European Union, respectively, for unlicensed use. In yet another example, 37-38.6 GHz band is expected to be opened and shared between commercial systems and future federal systems. The sharing framework is expected to be distinguished from general unlicensed spectrum.

SUMMARY

Embodiments of the present disclosure include an electronic device and corresponding method for managing a shared spectrum, and a base station (BS) for operating in a shared spectrum. One embodiment is directed to an electronic device that includes a memory storing instructions for managing the shared spectrum, and a processor operably connected to the memory and configured to execute the instructions to cause the electronic device to obtain coexistence measurement reports (CMRs) from the plurality of BSs; identify interference relationships among the plurality of BSs based on the CMRs; assign a set of BSs to one or more basic allocation units (BAUs) in a plurality of BAUs based on the interference relationships; and transmit a spectrum access grant (SAG) to the set of BSs, wherein the SAG includes BAU assignments for the set of BSs. Each BAU in the plurality of BAUs is a time/frequency unit and the set of BSs includes a primary BS and a secondary BS. The secondary BS can transmit in the one or more BAUs when a transmission of the secondary BS does not interfere with a transmission of the primary BS.

Another embodiment is directed to a BS for operating in a shared spectrum. The BS includes a transceiver configured to transmit a coexistence measurement report (CMR) to a shared spectrum manager (SSM) and receive a spectrum access grant (SAG) originating from the SSM which includes a set of assignments for one or more basic allocation units (BAUs) for the BS. The CMR indicates interference relationships between the BS and neighboring BSs. Each of the one or more BAUs is a time/frequency unit, and the set of assignments indicates that the BS is a primary BS or a secondary BS that can transmit in the one or more BAUs when a transmission of the secondary BS does not interfere with a transmission of another primary BS assigned to the one or more BAUs. The BS also includes a processor operably connected to the transceiver, the processor configured to generate the CMR and identify transmission opportunities for the BS based on the set of assignments for the one or more BAUs.

Yet another embodiment is directed to a method for managing a shared spectrum. The method includes obtaining coexistence measurement reports (CMRs) from the plurality of BSs, identifying interference relationships among the plurality of BSs based on the CMRs, assigning a set of BSs to one or more (basic allocation units) BAUs in a plurality of BAUs based on the interference relationships, and transmitting a spectrum access grant (SAG) to the set of BSs which includes BAU assignments for the set of BSs. Each BAU in the plurality of BAUs is a time/frequency unit. In addition, the set of BSs includes a primary BS and a secondary BS that can transmit in the one or more BAUs when a transmission of the secondary BS does not interfere with a transmission of the primary BS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Spectrum utilizations fluctuate temporally and geographically. Sharing the spectrum via multiplexing between different entities will enable more efficient utilization of the spectrum, whether it is unlicensed or shared spectrum. As used herein, the term "shared spectrum" is used in an inclusive manner without the distinction between the shared spectrum and unlicensed spectrum and it also includes not only the currently available spectrums but also spectrums that will be made available in the future.

In existing unlicensed spectrums, e.g., 2.4 GHz, 5 GHz, channel access is based on random access, i.e., carrier sense multiple access/collision avoidance (CSMA/CA). It is known that CSMA/CA with exponential backoff lowers the airtime utilization efficiency when the network densifies. Sharing is non-cooperative as it is based on regulations set by regulatory bodies and controlled by fixed rules. Fundamentally, there is no guarantee of spectrum access. Therefore, it may be disadvantageous for operators to use these unlicensed spectrums to deploy infrastructure systems for providing paid services to mobile subscribers, since the reliability and accessibility of the service cannot be guaranteed.

Novel aspects of this disclosure improve over this scheme by enabling multiplexing of users in the time dimension as well. Additionally, the medium access control scheme allows a secondary user to opportunistically access resources when the primary user is idle, or in the case that the primary user will not be impacted by interference from the secondary user's transmission.

Figure 1:
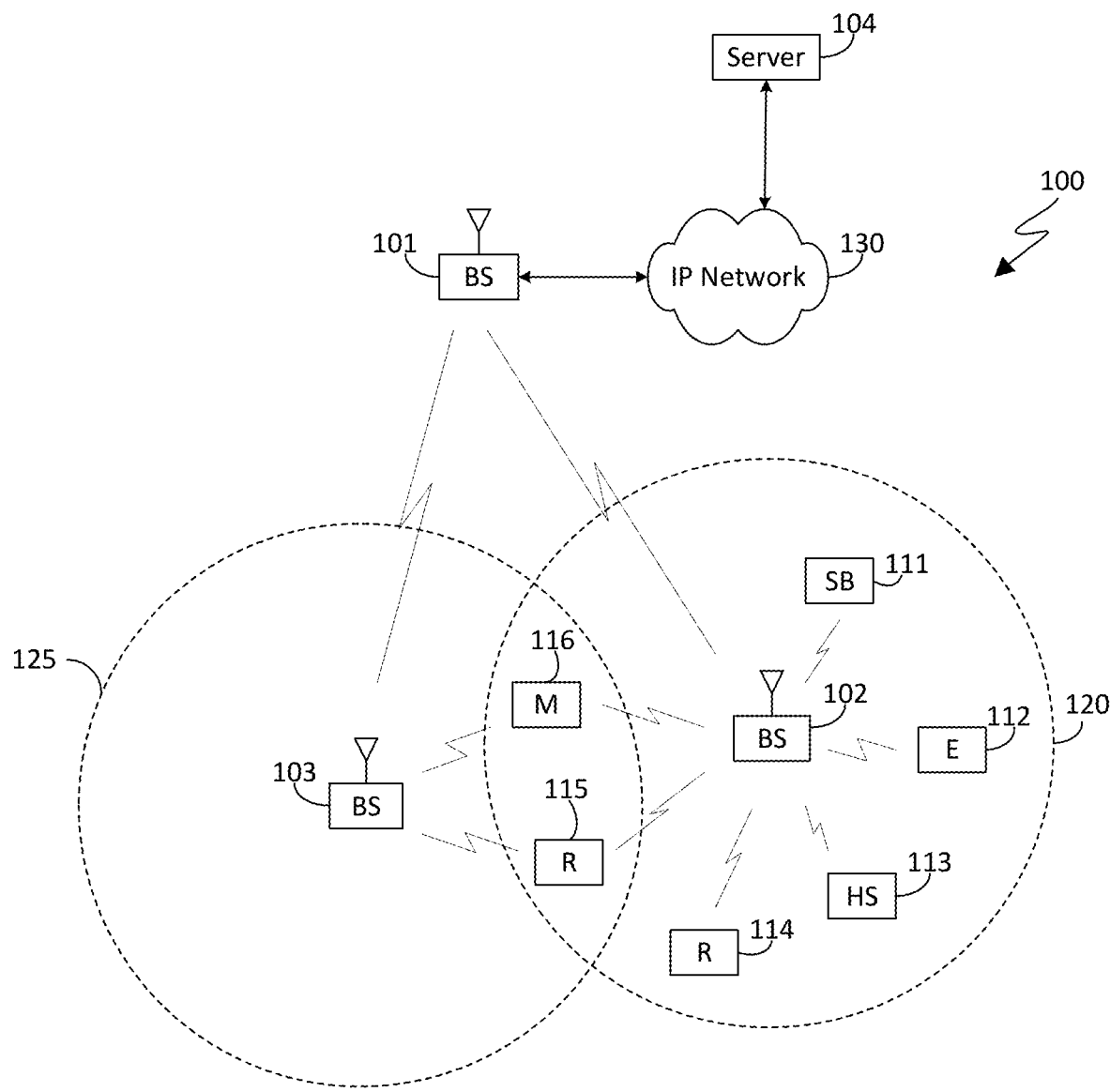
FIG. 1 illustrates an exemplary networked computing system according to various embodiments of this disclosure.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, BSs in a networked computing system can be managed to allow spectrum sharing based on interference relationships between BSs. In some embodiments, a shared spectrum manager in the networked computing system can provide a centralized resource coordination and assignment scheme by transmitting spectrum access grants to the BSs based upon coexistence measurement reports received from the BSs. As discussed in more detail in the paragraphs that follow, the SSM enables priority-based and opportunistic channel access through assigning different offsets to MNO and/or each base station.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
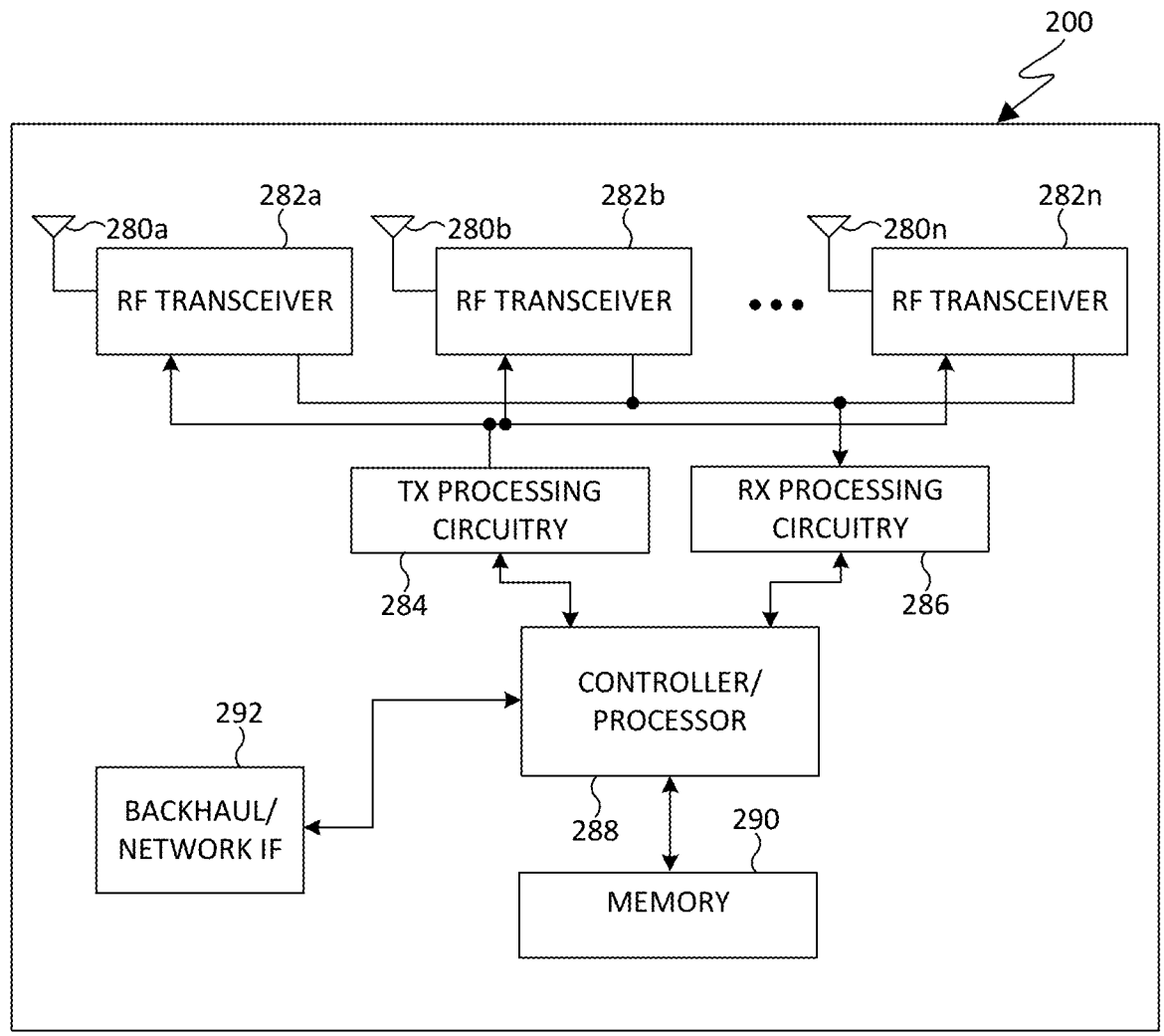
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as primary, secondary, and/or tertiary users of shared spectrum resources (i.e., BAUs) based on interference relationships with other neighboring BSs. Primary base station stations can transmit on a channel without first sensing the channel. Secondary base stations can transmit on the channel after a sensing operation determines that its data transmissions would not interfere with data transmissions of primary base stations. Tertiary base stations can transmit data on a channel in an opportunistic data transmission period, if available.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
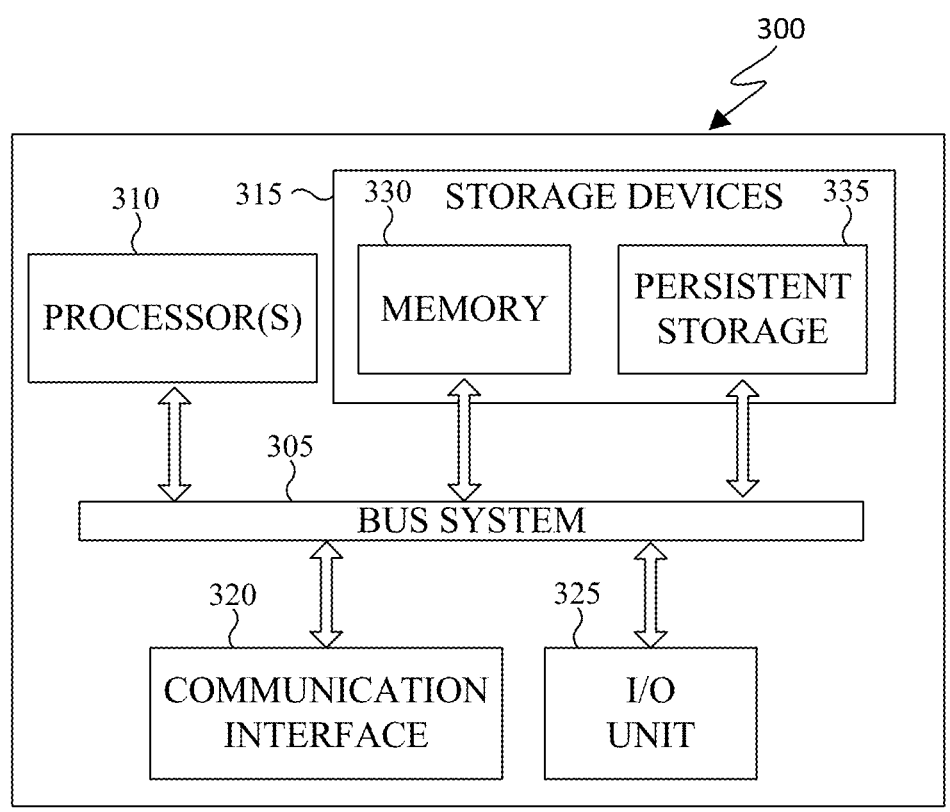
FIG. 3 illustrates an exemplary electronic device for managing a shared spectrum in the networked computing system according to various embodiments of this disclosure.

FIG. 3 illustrates an exemplary electronic device for managing a shared spectrum in the networked computing system according to various embodiments of this disclosure. In one embodiment, the electronic device is a shared spectrum manager implemented as a server 300, which can represent server 104 in FIG. 1.

As shown in FIG. 3, the server 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the server 300 can serve as a shared spectrum manager in a networked computing system can coordinate resource assignment to enable priority-based and opportunistic channel access through use of offsets in base allocation units identifiable by time slots and frequency bands.

Although FIG. 3 illustrates an example of an electronic device in a computing system for managing a shared spectrum among a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular server.

Figure 4:
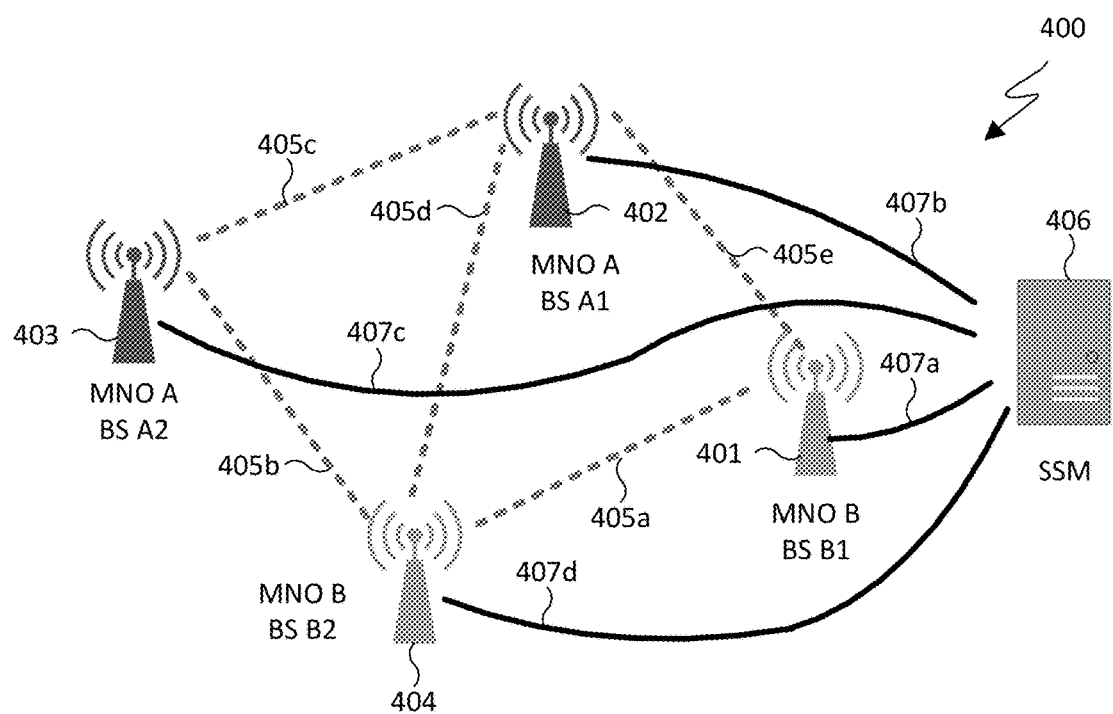
FIG. 4 illustrates a network for spectrum sharing according to various embodiments of this disclosure.

FIG. 4 illustrates a network for spectrum sharing according to various embodiments of this disclosure. Network 400 is a network computing system such as networked computing system 100 in FIG. 1.

The network 400 includes multiple BSs from different mobile network operators (MNOs), i.e., wireless service providers, coexisting in proximity with each other. As an example, BS 401 and BS 404 belong to the same MNO, e.g., "MNO B", and BS 402 and BS 403 belong to another operator, e.g., "MNO A". However, the particular depiction of the network in FIG. 4 is exemplary and not limiting. Thus, in other embodiments, the number of mobile network operators can differ, each with different systems and technologies sharing the spectrum.

In FIG. 4, BSs that interfere with one another are connected by dashed lines 405. For example, BS 401 and BS 404 interfere with each other and are connected by dashed line 405a; BS 401 and BS 402 interfere with each other and are connected by dashed line 405e; BS 402 and BS 404 interfere with each other and are connected by dashed line 405d; BS 403 and BS 404 interfere with each other and are connected by dashed line 405b; and BS 403 and BS 402 interfere with each other and are connected by dashed line

405c. BS 401 and BS 403 are separated by enough of a distance to prevent interference with one another.

Each of the BSs 401, 402, 403, and 404 are connected by their respective backhaul links 407 to shared spectrum manager (SSM) 406. SSM 406 is one or more electronic devices for managing the shared spectrum, such as electronic device 300 in FIG. 3. In a non-limiting embodiment, the SSM 406 is an entity in the core network of each MNO and configured to communicate with each other to manage the shared spectrum among BSs of all the MNOs. In another non-limiting embodiment, the SSM 406 is a third-party entity that does not belong to any of the MNOs but is configured to communicate with the different operators' networks for managing the shared spectrum among BSs of the MNOs.

Figure 5:
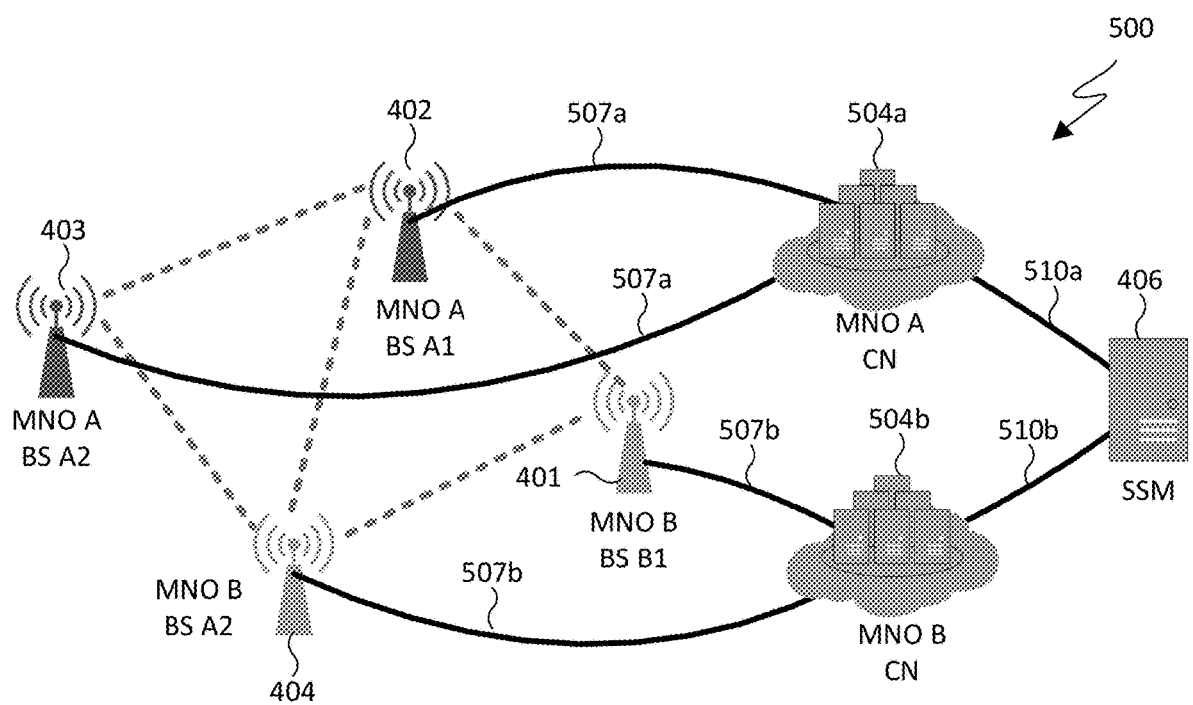
FIG. 5 illustrates another network for spectrum sharing according to various embodiments of this disclosure.

FIG. 5 illustrates another network for spectrum sharing according to various embodiments of this disclosure. Network 500 is a network computing system such as networked computing system 100 in FIG. 1.

The network 500 differs from the network 400 in that each BS communicates with an entity in its own MNO core network (CN) over backhaul links 507 rather than communicating directly to SSM 406. In this embodiment in FIG. 5, BSs 402 and 403 communicate with CN entity 504a over backhaul links 507a and BSs 401 and 402 communicate with CN entity 504b over backhaul links 507b. The CN entities 504a and 504b communicate with SSM 406 over their respective communication links 510. CN entities 504a and 504b can handle aggregation of data and/or transfer of messages, such as measurement reports, from the BSs to the SSM 406. The CN entities may also handle reception of messages from the SSM 406 on behalf of the BSs along with handling configuration of the BSs based on the parameters in these messages.

Figure 6:
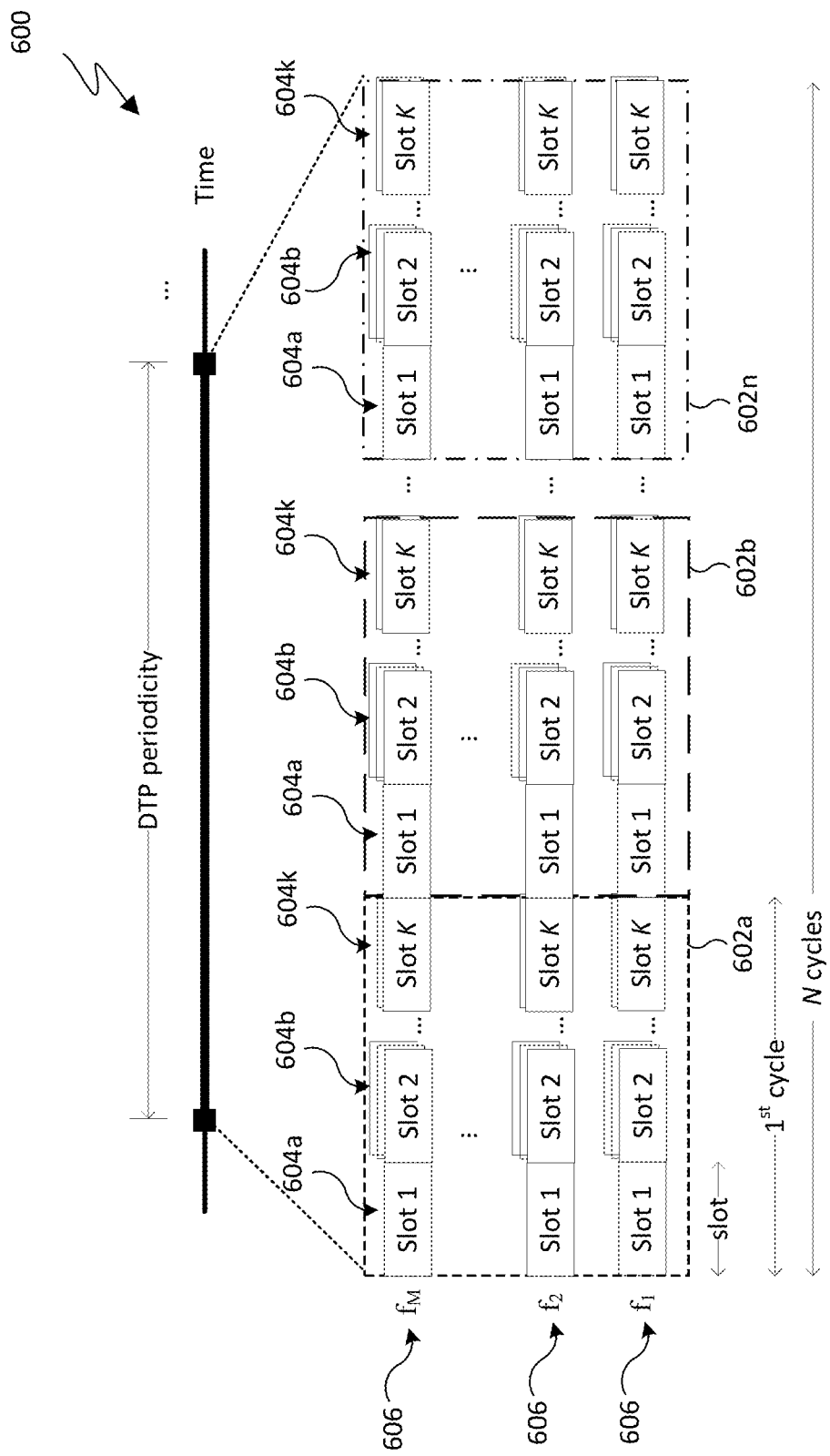
FIG. 6 illustrates a data transmission frame structure for spectrum sharing according to various embodiments of this disclosure.

FIG. 6 illustrates a data transmission frame structure for spectrum sharing according to various embodiments of this disclosure. The frame structure 600 defines the resources that are shared among BSs in a networked computing system, such as networked computing system 100 in FIG. 1, network 400 in FIG. 4, and network 500 in FIG. 5.

Frame structure 600 includes data transmission phase (DTP) cycles 602a through 602n, which are repeated sequences of time slots that can occupy a number of frequency spectrum bands (i.e., channels) 606. In FIG. 6, frame structure 600 has M spectrum bands $f_1$ through $f_M$.

A time slot over one frequency band is referred to as a Basic Allocation Unit (BAU). In the embodiment in FIG. 6, each DTP cycle 602 has K time slots 604a through 604k in the time dimension spanning M frequency bands. Thus, each DTP cycle can include a total of K×M BAUs. However, in other embodiments, the number of spectrum bands, time slots, bandwidth, center frequency, and duration of time slots can differ.

Figure 7:
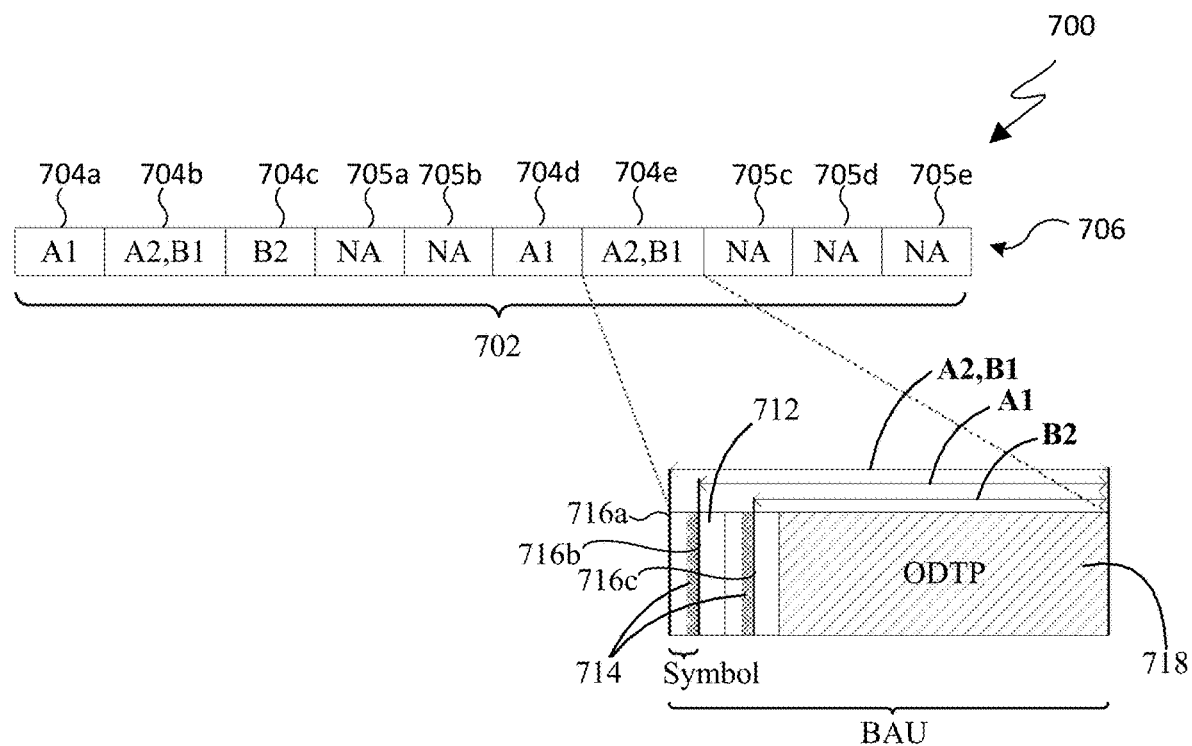
FIG. 7 illustrates assignment of base allocation units (BAUs) in a data transmission phase (DTP) for spectrum sharing according to various embodiments of this disclosure.

FIG. 7 illustrates assignment of base allocation units (BAUs) over one data transmission phage (DTP) cycle for spectrum sharing according to various embodiments of this disclosure. In this embodiment, DTP cycle 700 includes a set of BAUs 702 over a single frequency 706.

BSs A1, A2, B1, and B2 correspond to BSs 402, 403, 401, and 404 in FIG. 4, respectively. Thus, BS B1 and A2 are geographically separated and not in an interfering relationship so that they can be assigned to the same BAUs 704b and 704e for transmission. In contrast, BSs 401, 402, and 404 are in a mutually interfering relationship, as are BSs 402, 403, and 404. Thus, BSs 401, 402, and 404 are assigned BAUs in an orthogonal manner. Likewise, BSs 402, 403, and 404 are assigned BAUs in an orthogonal manner. For example, BS A1 of MNO A can transmit in BAUs 704a and 704d. BS B2 of MNO B can transmit in BAU 704c, which is orthogonal to BAUs 704a and 704d.

Figure 12:
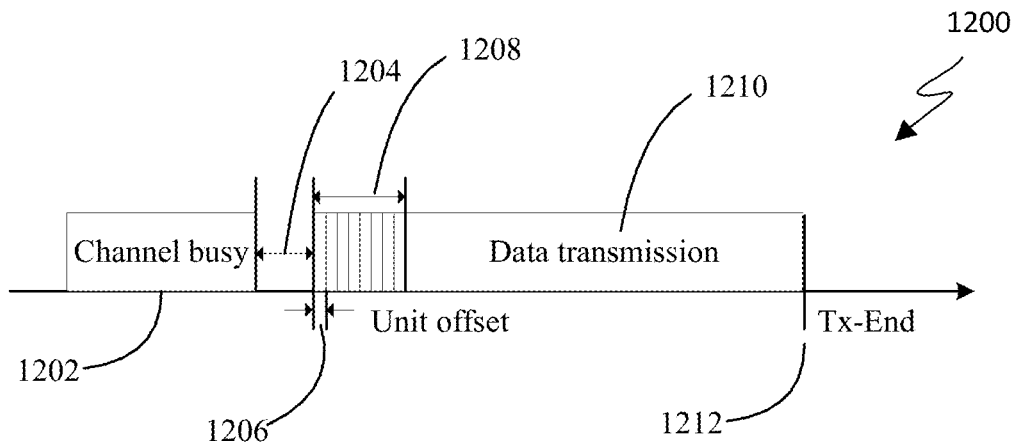
FIG. 12 illustrates an opportunistic data transmission period (ODTP) access scheme by a base station according to various embodiments of this disclosure.

BAUs 705 are Not Allocated (NA) to any MNO/BS and may be accessed according to the opportunistic access scheme described in FIG. 12 that follows.

Overview of Sharing Framework

Each of the BAUs in the set of BAUs 702 can be shared between one or more primary base stations and one or more secondary base stations. BSs assigned to a BAU may also be referred to in the alternative as "a user" of the resource. Further, a primary base station may also be referred to as a "protected base station" or a "protected user".

MNOs or a set of BSs assigned to a BAU can be granted protected access to one or more BAUs, which effectively prioritizes the availability of these resources for the protected users over other users. Protected access may be controlled by issuing Spectrum Access Grants (SAGs) to MNOs and/or BSs by an SSM, such as SSM 406 in FIGS. 4 and 5. The SSM 406 may serve as a database of SAGs which can be accessed by the protected user. SAGs may be transmitted as messages to users over the connections depicted in FIGS. 4 and 5. In one embodiment, SAGs include information elements indicating that BAUs are reserved for specific users. These are known as "protected BAUs". Protected BAU assignments may be issued to MNOs by a central spectrum licensing authority, such as a government regulator.

In another example, MNOs or network entities belonging to each MNO may negotiate among themselves to establish protected BAU assignments. The assignment of protected BAUs may change over time and may be periodically updated. In a SAG, BAU assignments may be assigned to individual BSs, a set of multiple BSs or an entire MNO network. As an example, the assignments for the BAUs in slots 604 may indicate that the MNO A network may access resources ($f_1,t_1$) of the DTP cycle. How the resources are utilized by different BSs belonging to MNO A may then be decided independently by the MNO.

Each BAU may be divided into symbols 712. The primary assignees, i.e., primary base stations, of the BAU may begin transmitting in a prioritized transmission period 716a without first performing spectrum sensing. In the BAU 704e, the prioritized transmission period 716a is found at the beginning of the BAU. In this example in FIG. 7, BSs A2 and B1 are the primary base stations assigned to BAU 704e. One or more BSs may also be assigned to one or more secondary transmission opportunity (TXOP) offsets 716b and 716c. These TXOP offsets may also be referred to herein as "offset periods". BSs may be assigned to a secondary TXOP by the SSM, which provides additional opportunities for BSs to transmit within the BAU. TXOP offset assignments may also be provided in the SAG and can also apply to assigned BAUs 704a, 704b, 704c, and 704d. Multiple BSs may be assigned to the same TXOP offset and a given BS may have multiple TXOP offsets assigned. In this illustrative embodiment, BS A1 and B2 are secondary BSs transmitting in offset periods 716b and 716c, respectively.

Before transmitting at the secondary TXOP offsets, the corresponding BS may first sense the channel during the Clear Channel Assessment (CCA) periods 714, as described below in flowchart 1100 in FIG. 11. If the channel is clear, the BS can begin transmitting at the following TXOP offset and may transmit for the remaining duration of the BAU, or for some Maximum Channel Occupancy Time (MCOT), if specified. The MCOT is the maximum time duration that a BS may transmit within the BAU before releasing the resource. Additionally, a BAU may be configured with an Opportunistic Data Transmission Period (ODTP) 718, which also may involve the CCA procedure in flowchart 1100. The location of the secondary TXOPs and ODTP within the BAU period may be indicated by the SSM in the SAG. Secondary TXOP and ODTP locations, along with the location and duration of the CCA periods, may be specified in terms of individual symbol, sample or time offsets. In another embodiment the TXOP and ODTP can be chosen by each BS or each MNO in a distributed fashion, either randomly or based on some metric.

DTP Resource Access with Protected Access Users

In one embodiment, assignment of resources via SAGs may restrict access to BAUs by only protected users specified in the SAGs, which prevents other MNOs and/or BSs from transmitting in these resources regardless of whether they could cause interference with the protected user or users. In another embodiment, a "soft licensing" scheme may be employed where the protected users are considered the primary assignee of the protected BAUs and may transmit in these resources without first needing to sense the channel for ongoing transmissions from other users. However, this embodiment, secondary users may opportunistically access the same BAU if the primary users are not actively utilizing the BAU or if the secondary user's transmission would not cause significant interference to the primary users. As an example, LBT may be employed by a secondary user to avoid collision with a primary user in the same BAU. By specifying TXOP offsets in a SAG, secondary users may be granted priority access to protected BAUs but with lower priority than the primary users. Each TXOP offset may apply to one or more secondary users.

As an alternative embodiment, any user may operate as a secondary user and transmit at specified TXOP offsets, regardless of whether they have been granted explicit access to the BAU in a SAG. In another embodiment, secondary offsets durations can be extended, and a group of BSs may be assigned to contend for access of the duration of the slot via LBT. Thus, the TXOP offset will function as a higher priority ODTP window.

Figure 8:
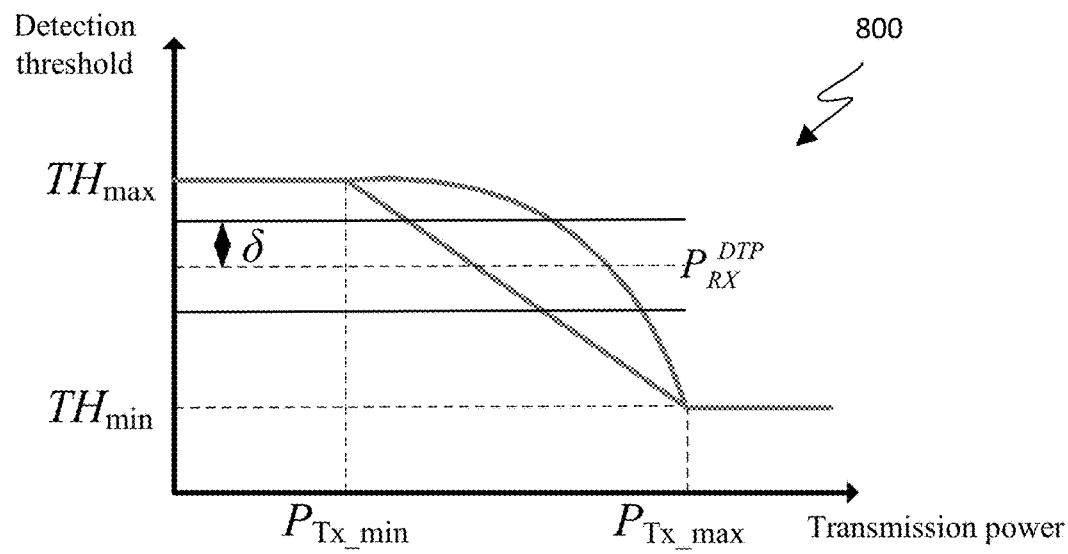
FIG. 8 illustrates a graph of a detection threshold function according to various embodiments of this disclosure.

FIG. 8 illustrates a graph of a detection threshold function according to various embodiments of this disclosure. The detection threshold function represented by graph 800 can be used by a BS to determine whether transmission in a secondary transmission opportunity is permissible, as described in more detail in FIG. 11 that follows.

Figure 9:
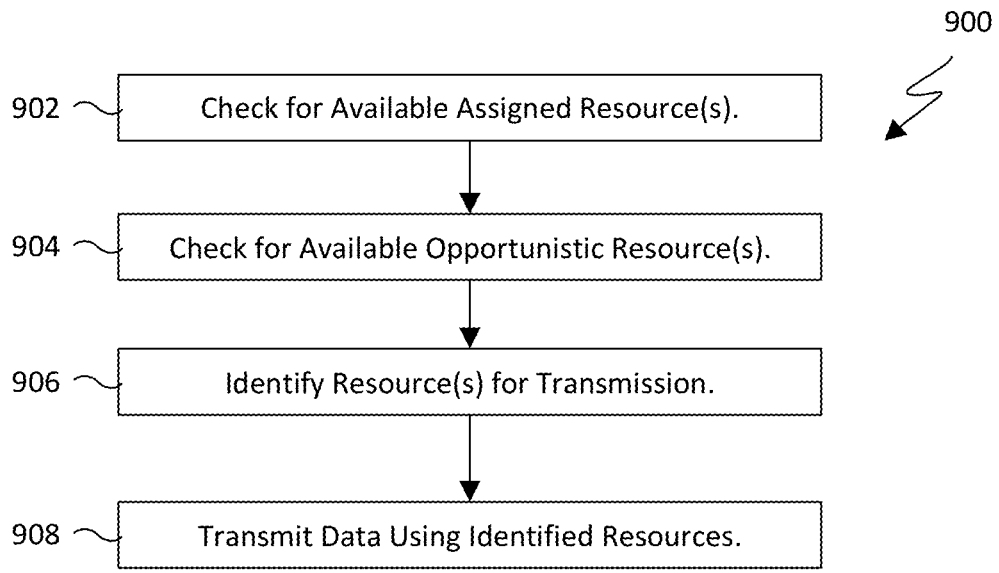
FIG. 9 illustrates a flowchart for a general DTP access procedure according to various embodiments of this disclosure.

FIG. 9 illustrates a flowchart for a general DTP access procedure according to various embodiments of this disclosure. The operations depicted in flowchart 900 can be implemented in a BS, such as BS 200 in FIG. 2.

In operation 902, a check is made for available assigned resources. A BS receiving assigned resources is a primary or protected BS for the assigned resource. In operation 904, a check is made for available opportunistic resources. A BS receiving opportunistic resources is secondary BS for the assigned resource. In a non-limiting embodiment, the assigned resources and opportunistic resources are provided in a spectrum access grant (SAG). The SAG can be generated by a shared spectrum manager (SSM), such as SSM 406 in FIGS. 4 and 5.

Thereafter, in operation 906 transmission resources are identified based on the checks made in operation 902 and 904. The identified resources can be an assigned resource and/or an opportunistic resource. In operation 908, data is transmitted using the identified resources.

Figure 10:
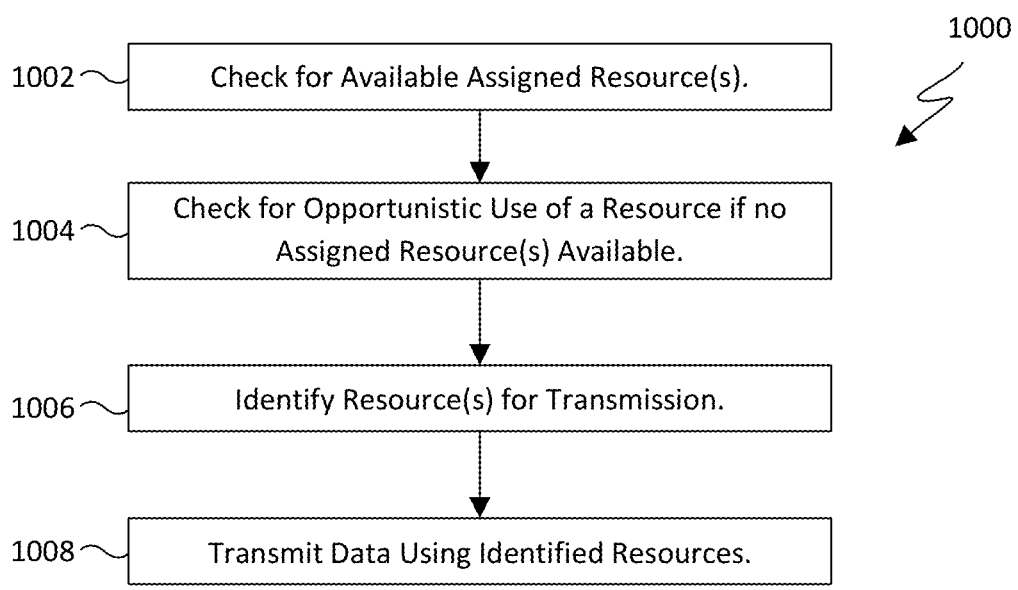
FIG. 10 illustrates another flowchart for a general DTP access procedure according to various embodiments of this disclosure.

FIG. 10 illustrates another flowchart for a general DTP access procedure according to various embodiments of this disclosure. The operations depicted in flowchart 1000 can be implemented in a BS, such as BS 200 in FIG. 2.

In operation 1002, a check is made for available assigned resources. In operation 1004, if assigned resources are not available, a check is made for available opportunistic resources. Thereafter, in operation 906 transmission resources are identified based on the checks made in operation 1002 and 1004. According to flowchart 1000, if assigned resources are available to a BS in operation 1002, then the BS will not perform a check for opportunistic resources in operation 1004. In operation 908, data is transmitted using the identified resources.

Figure 11:
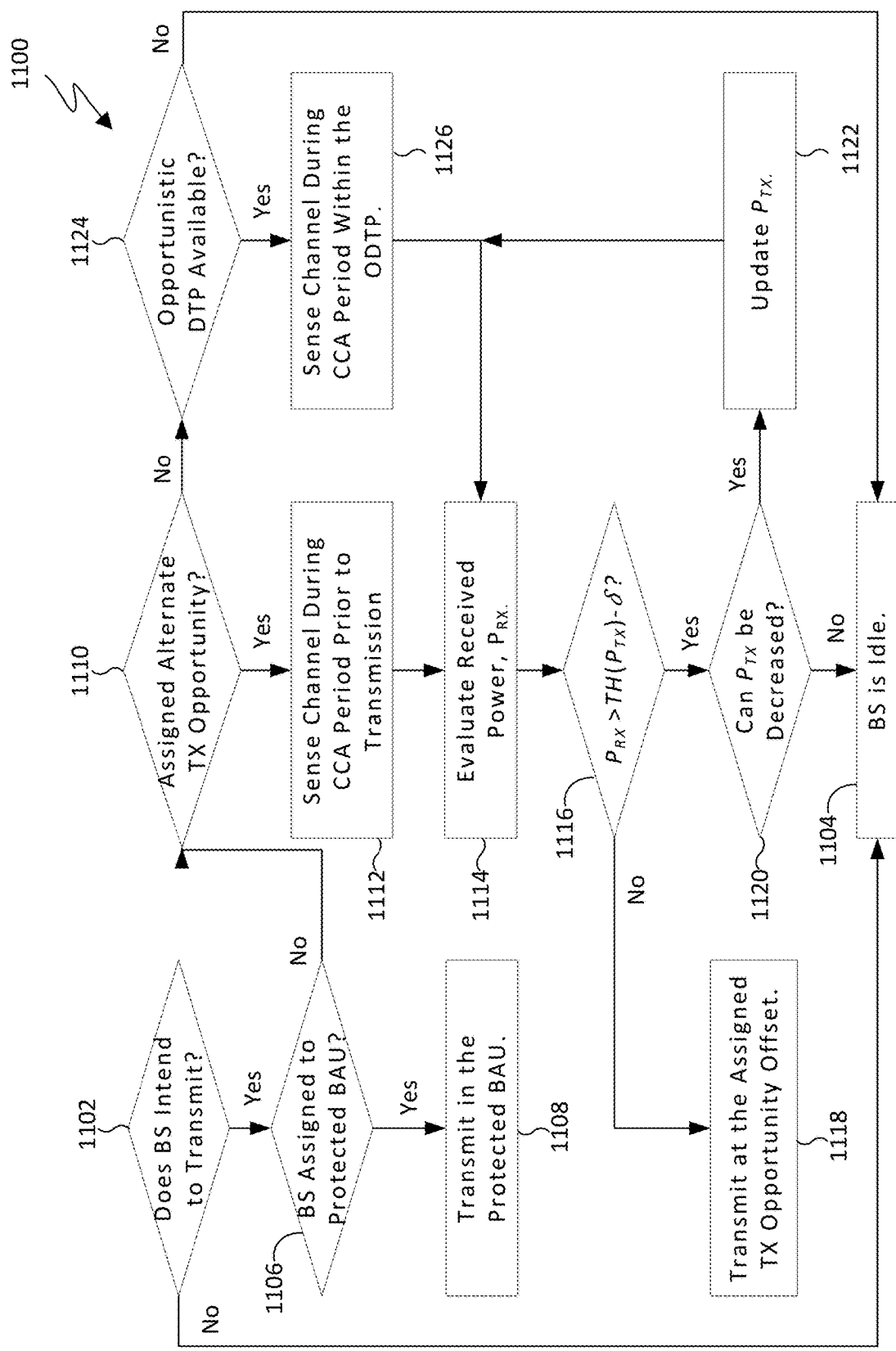
FIG. 11 illustrates a flowchart for determining transmission opportunities in a DTP by a base station according to various embodiments of this disclosure.

FIG. 11 illustrates a flowchart for determining transmission opportunities in a DTP by a base station according to various embodiments of this disclosure. The operations depicted in flowchart 1100 can be implemented in a BS, such as BS 200 in FIG. 2, to access DTP resources for a specific BAU.

Flowchart 1100 begins at operation 1102 with a determination as to whether the BS intends to transmit data, i.e., whether the BS has data to transmit. If the BS does not have data to transmit, then flowchart 1100 proceeds to operation 1104 where the BS remains in an idle state. However, at operation 1102, if the determination is made that the BS has data to transmit, then a determination is made whether the BS is assigned to a protected BAU in operation 1106. If the BS is assigned to a protected BAU, then flowchart 1100 proceeds to operation 1108 and the BS transmits its data on the protected BAU. In one embodiment, the BS can transmit its data at the start of its assigned BAU without first sensing the channel.

It may the case that the BAU is assigned to protected users, but the users are idle during the slot duration, possibly due to having an empty transmit data buffer or other reasons. Also, it is possible that secondary users (who are not allocated as primary users of the BAU), due to geographical separation and/or transmission power requirements, may be able to transmit in the protected BAU without causing high interference, which would affect the on-going transmission of the primary, protected users. It is also possible that the BAU is marked NA in the SAG and thus available to all users for opportunistic transmission. In the case of a NA BAU, the entire duration of the BAU may be treated as an ODTP and accessed in the manner described in more detail in FIG. 12.

Returning back to operation 1106, if the determination is made that the BS is not assigned to a protected BAU, then flowchart 1100 proceeds to operation 1110 where a subsequent determination is made as to whether the BS is assigned to an alternate transmission opportunity, i.e., secondary transmission opportunity, in the BAU, such as secondary transmission opportunities 716b and 716c in FIG. 7. If the BS is assigned an alternate transmission opportunity as determined in operation 1110, then flowchart 1100 proceeds to operation 1112 and the channel is sensed during the clear channel assessment (CCA) period prior to transmission. In a non-limiting embodiment, the sensing may be performed by detecting RF energy over one or more CCA periods of duration $T_{CCA}$. The location and duration of the CCA periods may be specified in terms of the symbol index, sample indices, or time or sample offset.

In operation 1114, the received power, $P_{RX}$, is computed over the CCA period. In one embodiment, $P_{RX}$ may be the total power from other transmitters. In another embodiment, the received power measurements are considered for each neighboring BS in the comparison operation. In this embodiment, the BS may detect a signal transmitted by neighboring BSs allowing the BS to identify these neighbors.

In operation 1116 the received power, $P_{RX}$, is compared to a threshold. In one embodiment, the threshold may be a function of the intended TX power of the BS, $TH(P_{TX})$, as illustrated in FIG. 8. In some embodiments, the threshold function can incorporate a detection margin δ to control the spatial reuse. In one embodiment, δ can be set to zero. In another embodiment, δ can be set to a positive value to control the level of the spatial reuse by setting a larger δ value to further discourage opportunistic transmission. In one embodiment, the value δ can be fixed. In another embodiment, the value δ can be different between the BSs belonging to the same network and between the BSs belonging to different networks. That is, there could be $δ_{inter-op}$ and $δ_{intra-op}$. With this distinction, a spatial reuse can be allowed more readily and generously between the BSs in the same network. In another embodiment, TH(·) can take the value δ as an input and may return the output threshold value adjusted according to the value δ.

In one embodiment, the threshold or threshold function, along with the detection margin δ, may be fixed to a value or a specific function or selected among preconfigured values and functions. In another embodiment, it may be assigned dynamically by the SSM in the SAG or negotiated between MNOs with or without assistance from the SSM, or it may be determined by some other means.

Returning to operation 1116, if $P_{RX}$ is not greater than the threshold, then flowchart 1100 proceeds from operation 1116 to operation 1118 where the BS may begin transmitting at the assigned transmission opportunity offset following the CCA period and continue transmitting for the remaining duration of the BAU. In another embodiment, the transmission may continue for a specified maximum channel occupancy time, which is less than the remaining BAU duration.

If $P_{RX}$ is greater than the threshold, then flowchart 1100 proceeds from operation 1116 to operation 1120 where a determination is made as to whether the transmission power, $P_{TX}$, can be decreased. If the transmission power cannot be decreased, then flowchart 1100 proceeds from operation 1120 to operation 1104 to allow the BS to return to the idle state for the remainder of the BAU. If the transmission power can be decreased, then the transmission power is updated in operation 1122 and flowchart 1100 cycles through operations 1114, 1116, 1120, and 1122 until the received power does not exceed the threshold in operation 11166 so that the BS can proceed to operation 1118 to being transmission.

Even if a BS is not assigned to the BAU as a primary BS in operation 1106 or a secondary base station in operation 1110, the BS may still have the opportunity to transmit in the opportunistic data transmission period (ODTP) as a tertiary base station. Thus, if the determination is made that an alternate transmission opportunity has not been assigned in operation 1110, then flowchart 1100 can proceed to operation 1124 where a determination is made as to whether an ODTP is available. If an ODTP is not available, then flowchart 1100 proceeds to operation 1104 and the BS remains idle for the remainder of the BAU. However, if an ODTP is available in operation 1124, then flowchart 1100 proceeds to operation 1126 to sense the channel during the CCA period within the ODTP. In the case of transmission in the ODTP, the BS may have to defer transmission until after an additional backoff period, as illustrated by backoff period 1206 in FIG. 12.

From operation 1126, flowchart proceeds to operation 1114 to evaluate the received power and provide the BS with an opportunity to reduce its transmit power, if possible. If the BS is not able to sufficiently reduce its power to avoid interference with an ongoing transmission of its neighbor in the ODTP, the BS will return to the idle state in operation 1104.

Opportunistic DTP Access Coordination

As already mentioned, ODTPs can be accessed opportunistically by any BS, regardless of protected BAU or secondary TXOP assignments. The ODTP can be accessed in a similar fashion to an assigned TXOPs by first performing the CCA procedure (e.g., operations 1126, 1114, and 1116 in FIG. 11) and transmitting if the channel is clear within the CCA period.

FIG. 12 illustrates an opportunistic data transmission period (ODTP) access scheme by a base station according to various embodiments of this disclosure. The ODTP access scheme can be implemented in ODTP 1200, which is similar to ODTP 718 in FIG. 7. In another embodiment, the ODTP access scheme can be implemented in a non-allocated BAU, i.e., a non-assigned BAU, such as NA BAUs 705 in FIG. 7.

Following the channel busy state 1202, there may be a minimum defer duration 1204, $D_{min}$, left idle as the original user may resume its transmission. Thus, this minimum defer duration is a means of providing higher priority to the BS which reserved the resource. After $D_{min}$ duration of inactivity, it may be assumed that the original owner has released the reserved resource. After the channel is sensed as idle for the defer duration, a BS will perform additional channel sensing with optional random backoff selected from backoff period 1208. The backoff period 1208 is formed from a set of time units 1206. In one embodiment, the number of random backoff time units 1206 is randomly determined. As an example, a random number can be uniformly drawn from [X, Y] value range, where X and Y are non-negative integers representing the minimum and maximum possible values, respectively, of the backoff period 1208. In one embodiment, X can be 0. In one embodiment, Y, namely the contention window size (CWS), may be configured or informed to the BSs. In another embodiment, Y can be varying and negotiated between the operators. In one embodiment Y can be common. In another embodiment, Y can be cell specific. In yet another embodiment, Y can be operator specific. After successful channel sensing over the optional random backoff period, the BS may start data transmission in the data transmission state 1210 until the end 1212 of the ODTP. In another embodiment, there may be a specified MCOT after which the BS will cease transmitting and release the resource.

Coexistence Measurement Reports

To facilitate configuration of BSs by the SSM, each BS may be configured to send Coexistence Measurement Reports (CMRs) to the SSM. A CMR sent by a given BS may include but is not limited to the following list of information elements. The SSM may also specify which of the following information elements are requested, so that the BS may send a subset of the following to the SSM or any required entities.

Identifying information for the MNO and BS. This information element can include the Mobile Network Code (MNC), Mobile Country Code (MCC), the Extended Cell Global Identifier (ECGI), the Physical Cell Identifier (PCI), and/or other similar and related identifiers.

A list of neighboring BSs. This information element can also include associated power levels measured either at the BS or its mobile users, if available. The measurements may be specified on a per-BAU basis.

A list of neighboring BSs and their power levels. This information element can be reported by the current mobile users connected to the BS. These measurements may be specified whenever there are changes in the extended interference map between other BSs and the reporting BS's connected mobile users. The list may contain all other BSs detected by the BS or may be restricted to the set of BSs exceeding a threshold over the reporting period, along with an indication of the BAUs in which the other BSs were detected. Received power may be determined at the BS's receiver by receiving the synchronization signals, reference signals or other signals transmitted by neighboring BSs and reported as a value, e.g., in dBm, measured at the receiver, or some quantized representation of the value. The list may also indicate whether neighboring BSs may be allowed to be assigned to the same protected BAU, or the BS is explicitly requesting to be assigned to the same BAU as these other BSs. This may occur when the BS has multiple neighboring BSs belonging to the same MNO network, which are able to coordinate access among themselves.

A list of specific BSs that have been detected as causing detrimental interference to its users. This information element may also include the indices of protected BAUs in which this interference is occurring. The BS may thus explicitly request to be assigned orthogonal resources from these indicated BSs.

The intended TX power of the BS. This information element can include a single value applying to all BAUs or a list of values per BAU may be provided.

RSSI, RSRP and/or RSRQ measurements reported by the mobile users of the BS. This information element can include individual measurements compiled and reported as a list or aggregated in some fashion, such as by taking the average measurement or other statistics, or by computing a histogram of measurement values. Measurements may be reported as the original values measured at the mobile receivers or by some quantized values, which are encoded from the original values. Separate measurements or aggregated measurements may be provided for each BAU.

Load or demand information for the BS. This information element can include an indicator of whether there is buffered data at the BS, the amount of buffered data (either represented as the total quantity of bytes or as a quantized or encoded value representing a range of byte quantities), as well as an estimate of how many BAUs are requested by the BS for data transmission in the DTP. Load information reports may also be differentiated by priority level of different traffic.

Channel occupancy measurement(s). This information element can indicate the percentage of time that the channel is measured as busy over the entire DTP or for individual slots or BAUs.

Indicator(s) specifying protected DTP BAUs that are no longer used or requested by the original assignee BS.

Indicator(s) specifying DTP BAU indices in which strong interference is detected by the BAU.

A timestamp or time index indicating when the above measurements were performed.

Figure 15:
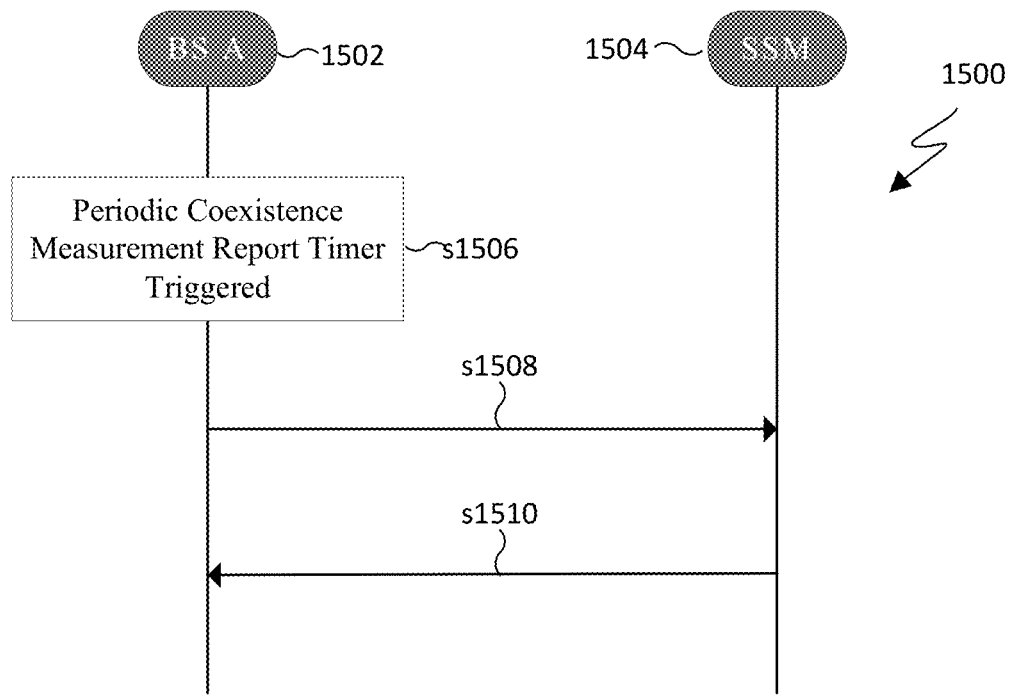
FIG. 15 illustrates a signal flow diagram for periodic signaling of CMRs and SAGs according to various embodiments of this disclosure.
Figure 16:
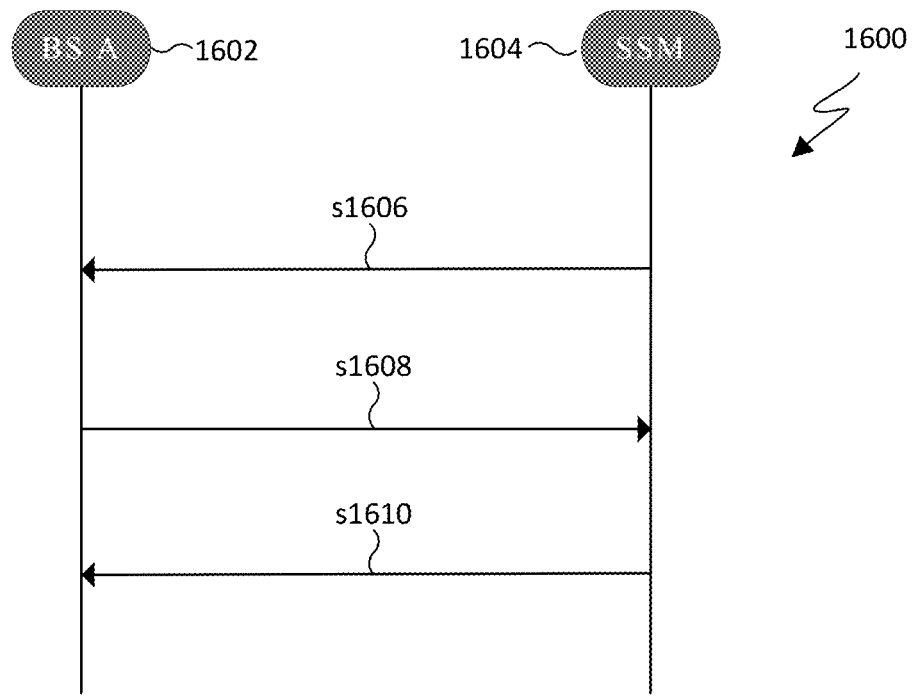
FIG. 16 illustrates a signal flow diagram for aperiodic signaling of CMRs and SAGs according to various embodiments of this disclosure.

In some embodiments, transmission of CMRs may be triggered periodically with some fixed period, such as every N cycles for some positive integer N, as shown in FIG. 15. In other embodiments, CMRs may also be triggered aperiodically based on a CMR Request sent from the SSM to the BS, as shown in FIG. 16. A CMR may also be triggered by each individual BS or network provider upon noticing, for example, a significant change in the interference levels or the list of neighbors. The scope for this CMR update can be local (BS specific), network provider specific or global.

Spectrum Access Grants

As previously described, SAG messages can be sent by an SSM to a BS, or a network entity controlling one or more BSs, in order to configure the BSs and assign resources in units of BAUs. SAGs may contain but are not limited to the following information elements.

Identifiers specifying the BSs or network entities for which the SAG is intended.

Overall frame structure. This information element can include the number of DTP cycles, DTP cycle size (i.e., the values of N and K from FIG. 6) or, alternatively, the number of slots and slot length.

Detection threshold function parameters. This information element can specify the slope of function $TH(P_{TX})$ and $TH_{max}$, $TH_{min}$.

Maximum allowed transmission power.

Contention window size. This information element provides for opportunistic channel access.

Protection margin $\delta$ for opportunistic channel access.

Assignment of a synchronization source. This information element is used to derive the timing of DTP cycle transmissions.

The BAU allocation for each MNO or BS. This information element may include indicators specifying whether the BAU assignment is per-MNO or per-individual BS. In one embodiment, the protected BAU allocation may be specified by carrier frequency and bandwidth in the frequency dimension, slot indices in the time dimension (denoted by the pair {starting instance, duration} or {starting instance, end instance}), or any combination of these or equivalent encoded or representative parameters. In another embodiment, the BAU allocation may be specified by a bitmap where the allocation list is encoded into a binary number or vector, where each binary digit or place value being set to "1" or a pre-defined value can indicate the corresponding BAU index (or, equivalently, slot and/or frequency band index) is allocated to the recipient of the SAG. The location of the BAUs corresponding to binary digits in the bitmap may not be consecutive but may follow a pre-established pattern where BAUs are located non-consecutively in time and/or frequency. In yet another embodiment, the BAU allocation may follow some pre-established pattern, which is indicated by a parameter in the SAG.

The TXOP offset assignments for each MNO or BS. This information element specifies the location of assigned TXOPs and may follow the same formats as described above for the BAU assignments.

An indicator signaling the availability of the ODTP within a specified BAU. This information element may also specify the start and duration of the ODTP, if enabled.

The Maximum Channel Occupancy Time. This information element can specify the maximum duration of transmissions.

A timestamp or time index for indicating when the above parameters may be applied by the BS.

Signaling of CMRs and SAGs

Figure 13:
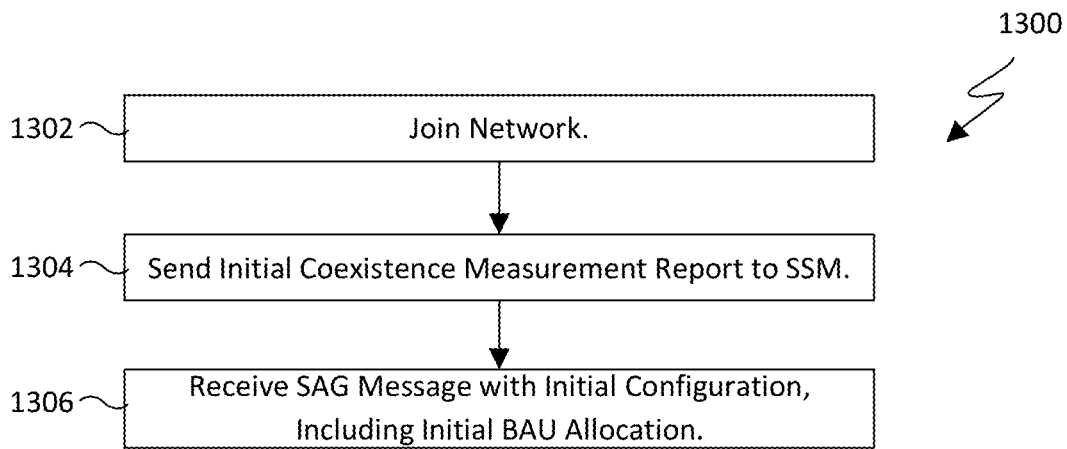
FIG. 13 illustrates a flowchart for signaling of coexistence measurement reports (CMRs) and spectrum access grants (SAGs) according to various embodiments of this disclosure.

FIG. 13 illustrates a flowchart for signaling of coexistence measurement reports (CMRs) and spectrum access grants (SAGs) according to various embodiments of this disclosure. The operations depicted in flowchart 1300 can be implemented in a BS, such as BS 200 in FIG. 2. Further, flowchart 1300 can be performed by a BS as a means to register itself with the SSM, such as SSM 406 in FIG. 4, for onboarding onto the network.

In operation 1302, the BS joins the network. In operation 1304, an initial CMR is sent to the SSM. The CMR can include some or all of the information elements described above and, optionally, a connection notification information element notifying the SSM that the cell is newly active. In one embodiment, the CMR may simply serve as a request for updating the resource allocation in the SAG and may not necessarily contain any additional information elements. In operation 1306, a SAG message is received with initial configuration information, such as initial BAU or secondary transmission opportunity assignments along with any other configuration parameters. The SAG is received from the SSM, or a CN entity connected to the SSM, such as CN entity 504 in FIG. 5.

Figure 14:
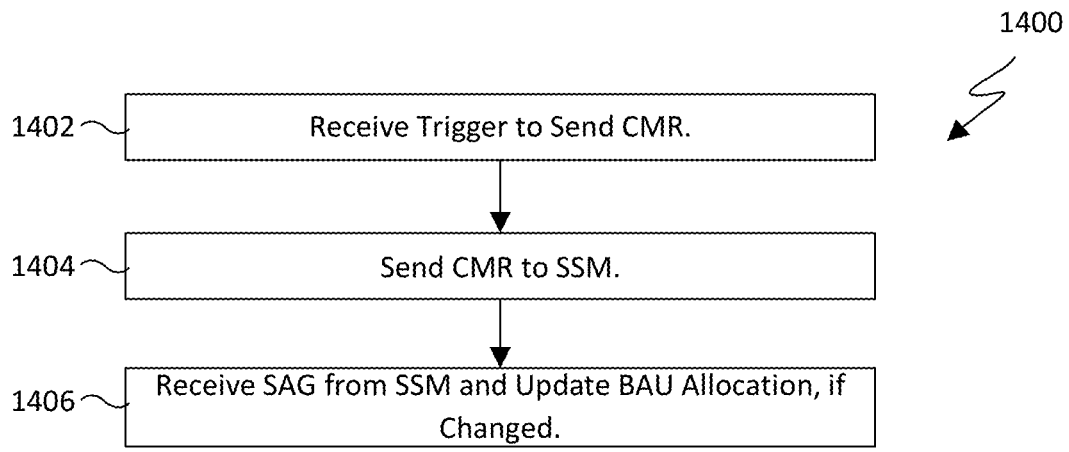
FIG. 14 illustrates a flowchart for periodic and aperiodic signaling of CMRs and SAGs according to various embodiments of this disclosure.

FIG. 14 illustrates a flowchart for periodic and aperiodic signaling of CMRs and SAGs according to various embodiments of this disclosure. The operations depicted in flowchart 1400 can be implemented in a BS, such as BS 200 in FIG. 2. In addition, the operations of flowchart 1400 can be performed after operations in flowchart 1300, i.e., after a BS has already been onboarded onto the network.

In operation 1402, a trigger is received to send a CMR. The trigger can be received periodically after some fixed duration, as described in FIG. 15, or received aperiodically, as described in FIG. 16.

In operation 1404, a CMR is sent to the SSM. Thereafter, a SAG may be received from the SSM for updating BAU allocation in operation 1406 if changes are required. Thus, in some embodiments, a SAG received in operation 1406 may not the BS with protected BAUs.

In between receiving SAG list updates, each BS may query its local cache of SAG allocations to determine its assigned configuration parameters and current BAU allocation. In an alternative embodiment, a separate network entity, such as a core network node within the MNO network of the BS, e.g., CN entity 504 in FIG. 5, may contact the SSM, on behalf of the BS, and handle reception of CMRs or constituent data elements from the BS, SAG messages from the SSM and/or configuration of the BS based on the SAG parameters. In an alternative embodiment, a BS may send an updated CMR of its own volition to request new BAU allocation from the SSM. This can be done, for example, in instances where there are changes to the circumstances of the BS's connected mobile users, including connection status, location, or link performance.

FIG. 15 illustrates a signal flow diagram for periodic signaling of CMRs and SAGs according to various embodiments of this disclosure. The steps depicted in signal flow diagram 1500 can be implemented between a BS 1502 and an SSM 1504 in a communications network. As an example, the steps in signal flow diagram 1500 can represent signal transmission between BS 401 and SSM 406 in FIG. 4.

In signal flow diagram 1500, a periodic coexistence measurement report timer is triggered in s1506. In response, the BS 1502 transmits a CMR to SSM 1504 in s1508. In s1510 the SSM 1504 transmits a SAG to the BS 1502.

FIG. 16 illustrates a signal flow diagram for aperiodic signaling of CMRs and SAGs according to various embodiments of this disclosure. The steps depicted in signal flow diagram 1600 can be implemented between a BS 1602 and an SSM 1604 in a communications network. As an example, the steps in signal flow diagram 1500 can represent signal transmission between BS 401 and SSM 406 in FIG. 4.

In s1606, the SSM 1604 transmits a CMR request to BS 1602. In response, the BS 1602 transmits the requested CMR in s1608. Thereafter, the SSM 1604 transmits a SAG to the BS 1602 in s1610.

Interference Graph Computation

Figure 17:
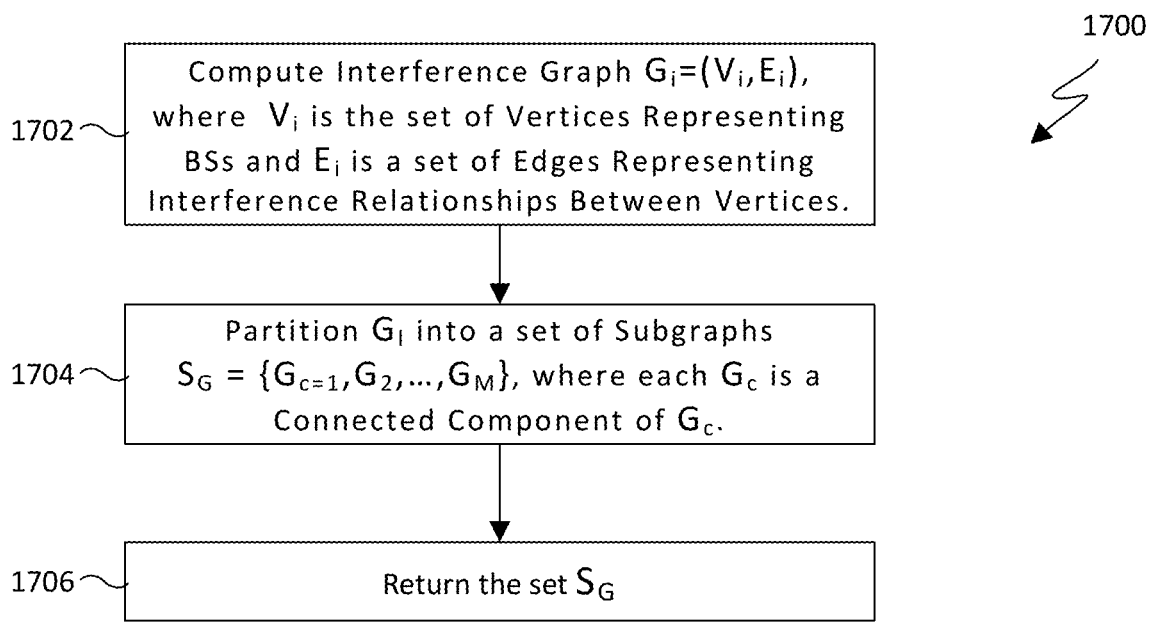
FIG. 17 illustrates a flowchart for computing a network interference graph and connected components according to various embodiments of this disclosure.

FIG. 17 illustrates a flowchart for computing a network interference graph and connected components according to various embodiments of this disclosure. Operations of flowchart 1700 can be implemented in an SSM, such as SSM 406 in FIGS. 4 and 5.

An SSM generates a network interference graph based on information provided in the CMRs. The network interference graph facilitates the allocation of BAUs to different users. The interference graph represents the interference relationships between BSs in the network.

In operation 1702, an interference graph $G_I$ is computed. The interference graph $G_I=(V_I, E_I)$ is a function of $V_I$ and $E_I$, where $V_I$ is the set of vertices v representing BSs in the network and $E_I$ is the set of edges e representing interference relationships between BSs. An edge $e=(v_{TX},v_{RX})$ is included in $E_I$ if the received power at BS $v_{RX}$ from BS $v_{TX}$ (reported by the BSs to the SSM in CMR messages) exceeds a threshold. This threshold may be a function of the intended TX power of $v_{RX}$, as in operation 1116 of FIG. 11, and determined by the SSM based on the intended TX power reported in a CMR.

In some embodiments, interference graph $G_I$ is not a connected graph. A connected graph is defined as a graph where, for all pairs of vertices $v_1, v_2 \in V$, a path exists connecting $v_1$ and $v_2$. Thus $G_I$ may have one or more connected component subgraphs, where there is exists no path between the vertices of each component subgraph. In other words, $G_I$ may be partitioned into one or more connected components $G_c$ in the set $S_G=\{G_1, G_2, \ldots, G_M\}$, where M is the number of connected components and there exists no edge between any pair of subgraphs in $S_G$.

In operation 1704, the interference graph $G_I$ is partitioned into subgraphs $S_G$. Connected components of $G_I$ can be computed by applying one of the well-known algorithms used for this purpose.

In operation 1706, the set $S_G$ is returned and may be used by the SSM for assigning resources (i.e. BAUs) to BSs. The BAUs can be orthogonal or even non-orthogonal in cases to allow for higher resource efficiency. The SSM may be able to perform the resource assignment independently for each connected component $G_c$ due to the constituent BSs of each component having no mutual interference relationship.

Spectrum Assignment Algorithm

Figure 18:
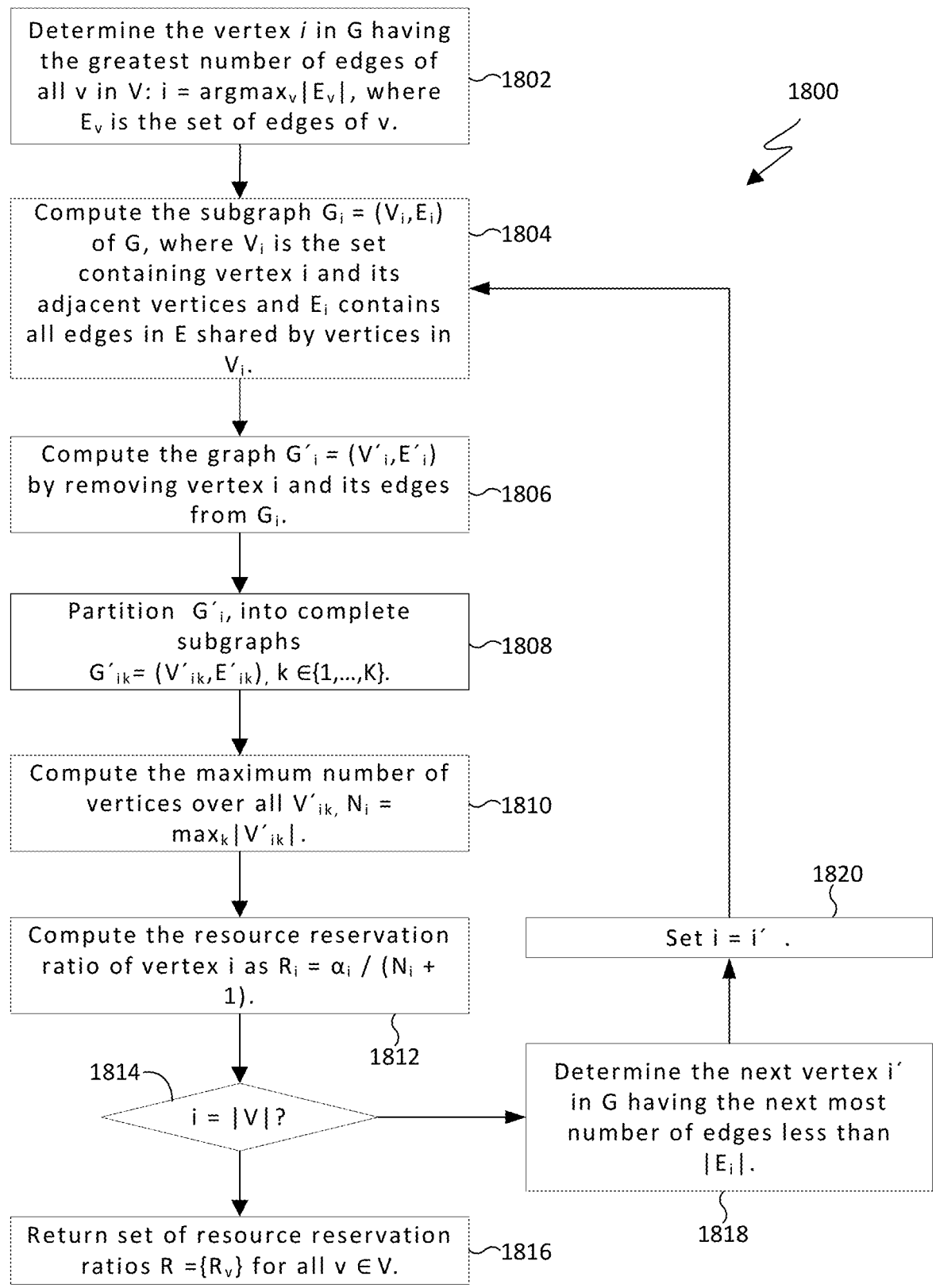
FIG. 18 illustrates a flowchart for computing resource reservation ratios according to various embodiments of this disclosure.

An exemplary algorithm is provided in FIG. 18 which may be used by an SSM or equivalent entity for assigning BSs to BAUs within a time/frequency/code slot or channel. The algorithm may be performed by the SSM in order to partition the network into a set of nodes that may be assigned to orthogonal resources, while the remaining set of nodes may share resources to improve spatial reuse. The SSM proceeds by evaluating each BS in order of the number of interference relationships. For each BS, a new graph is computed by taking the subgraph of the BS and its neighbors in the interference graph, along with any edges between these nodes, and then removing the BS and its adjacent edges from this subgraph. The resource reservation ratio, which determines the fraction of resources the BS may be assigned under equal sharing, can then be computed as a function of the number of nodes in each connected component (isolated subgraph) of the resulting graph. Formally, the SSM can perform the below operations on one of the connected components of the interference graph G, which for simplicity is denoted G=(V,E), where V is the set of vertices representing BSs and E is the set of edges representing interference relationships between BSs.

FIG. 18 illustrates a flowchart for computing resource reservation ratios according to various embodiments of this disclosure. The operations depicted in flowchart 1800 can be implemented in an SSM, such as SSM 406 in FIGS. 4 and 5.

Flowchart 1800 begins at operation 1802 by identifying the vertex i in V having the most edges in E, i.e., $$i = \underset{v \in V}{\mathrm{argmax}} |E_v|,$$

where $E_v$ is the set of edges adjacent to vertex v, with ties broken arbitrarily.

In operation 1804, the subgraph $G_i=(V_i,E_i)$ of G is computed, where $V_i$ is the set containing vertex i and its adjacent vertices $u \in V$, s.t. $\exists e \in E$ where $e=(i, u)$, and $E_i$ contains all edges in E shared by vertices in $V_i$ (i.e., i and its neighbors u).

In operation 1806, the graph $G'_i=(V'_i,E'_i)$ is computed by removing vertex i and all of its edges $E_i$ from $G_i$. In operation 1008, the graph $G'_i$ is partitioned into connected components $G'_{ik}=(V'_{ik},E'_{ik})$, $k \in \{1, \ldots, K\}$. The SSM initially considers the subgraph $G'_{ik=1}$ for further processing.

In operation 1810, the maximum number of vertices $N_i$ over all connected components $G'_{ik}$ is computed. In operation 1012, the SSM computes the reservation ratio as $$R_i = \frac{\alpha_i}{N_i + 1}$$

where $\alpha_i$ is a parameter that may be used to control the priority of different BSs or MNO users. The resource reservation ratio is the fraction of resources in each DTP cycle allocated to BS i. By setting $\alpha_i=1$, equal priority is offered to each user. However, by increasing $\alpha_i>1$, BS i may be given a larger portion of the time-domain resources.

In operation 1814, a determination is made as to whether all vertices for this connected component of G has been evaluated. If all vertices for the connected component of G has been evaluated, then flowchart 1800 proceeds to operation 1816 and returns the vector of resource reservation ratios $R=\{R_v\}$ for all $v \in V$. However, if all vertices for the connected component of G has not been evaluated, then flowchart 1800 proceeds to operation 1818 and selects the vertex with the next most edges in E and sets i equal to the index of this vertex in operation 1820 and returns to operation 1804.

Figure 19A:
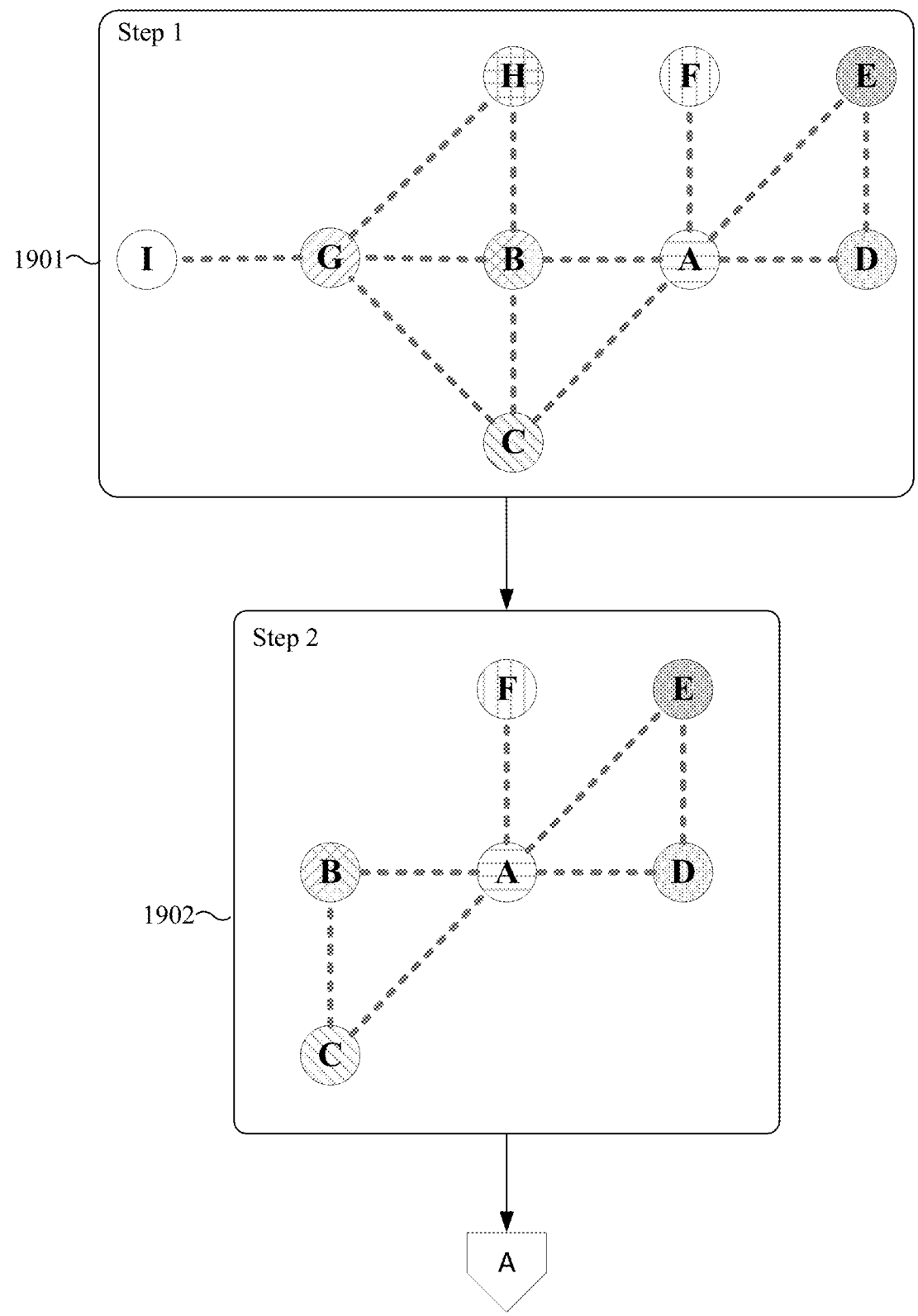
FIGS. 19A-19C illustrate steps for assigning BAUs from a network interference graph according to various embodiments of this disclosure.
Figure 19B:
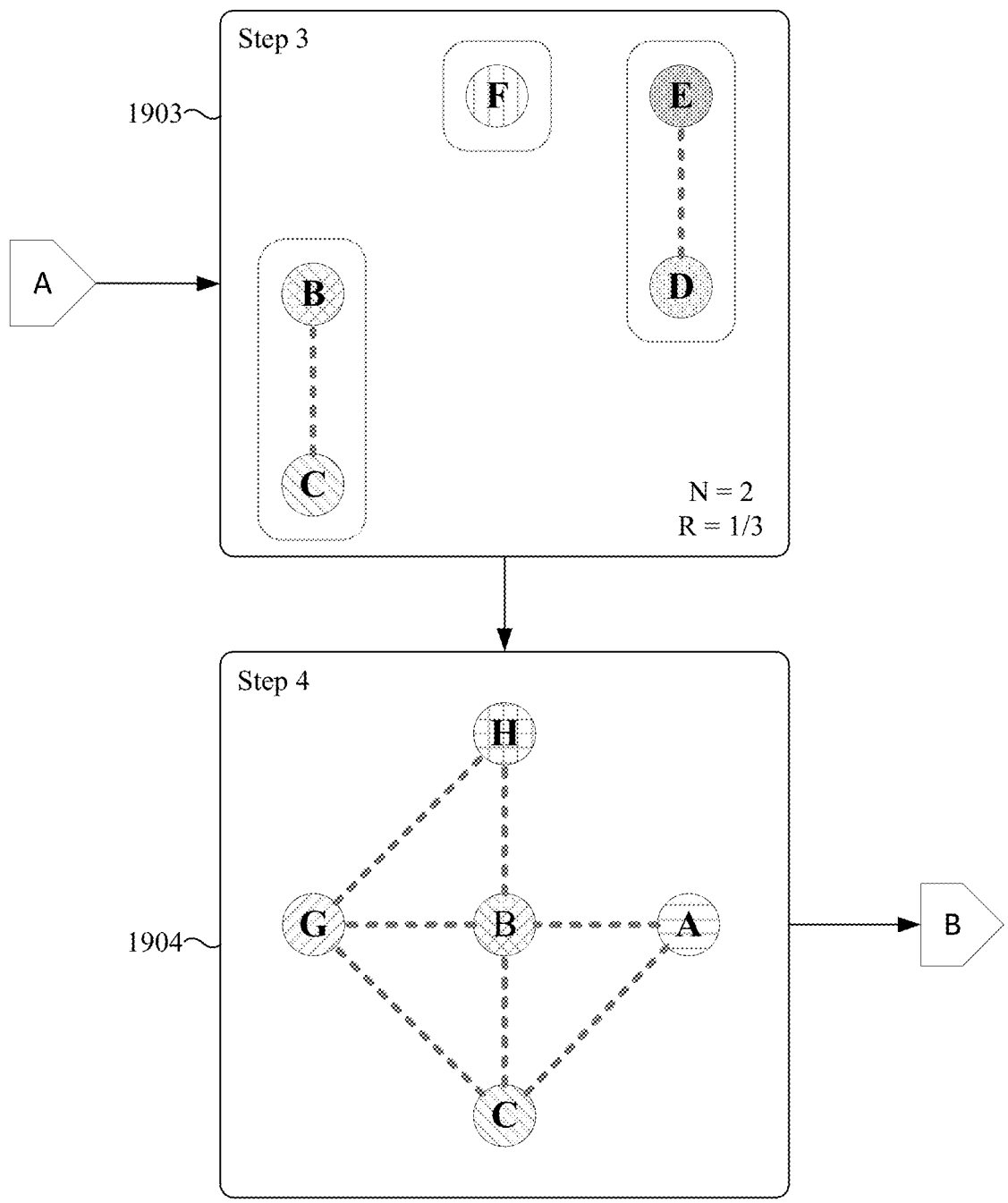
Figure 19C:
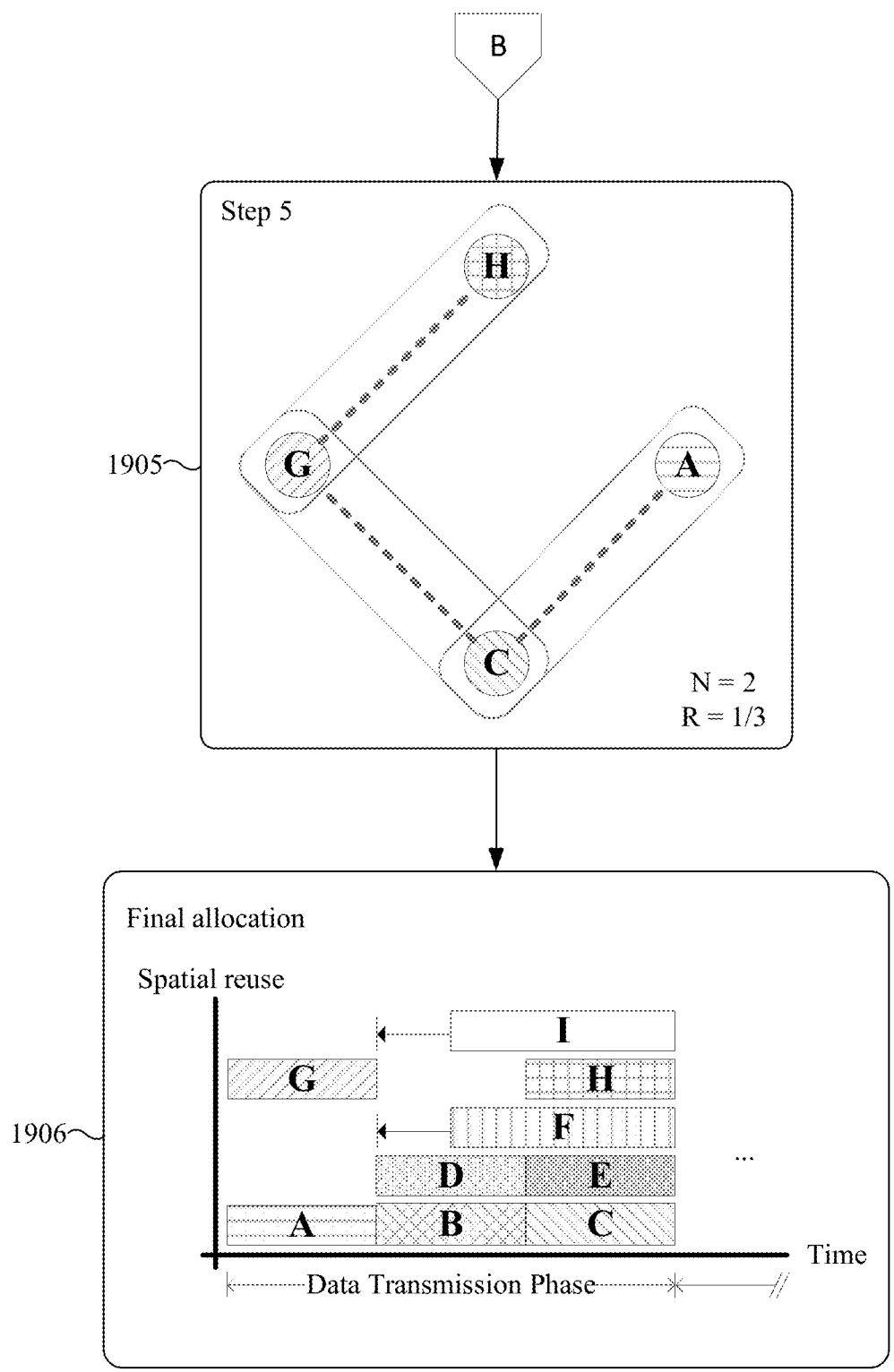

FIGS. 19A-19C illustrate steps for assigning BAUs from a network interference graph according to various embodiments of this disclosure. The steps depicted in flowchart 1900 can be implemented in an SSM, such as SSM 406 in FIGS. 4 and 5.

In a first step 1901 the interference graph G is computed. In one embodiment, the interference graph is computed in the manner described in operation 1702 in FIG. 17 with each vertex representing a BS and each edge representing an interference relationship between nearby BSs. In this case, there is only one connected component, which is the entire graph G.

In a second step 1902, vertex A is determined to have the most edges and the subgraph $G_A$ is constructed. This step 1902 corresponds with operations 1802 and 1804 in FIG. 18.

In a third step 1903, the graph $G'_A$ is computed by removing vertex A and its edges. Also, in the third step 1903, $G'_A$ is partitioned into three connected components. Two of the connected components contain two vertices, so following operation 1810 in FIG. 18, $N_A=2$ and, by operation 1812 in FIG. 18, $R=\frac{1}{3}$ (assuming $\alpha_i=1$).

In the fourth step 1904 and the fifth step 1905, the operations 1804 through 1812 in FIG. 18 are repeated for vertex B, which has the next most edges of all vertices in G. The procedure may be then repeated for vertices G, C, D, E, H, F, and I, in this order and by breaking ties between edge counts arbitrarily, until the reservation ratios $\{R_i\}$ have been computed for all vertices. Finally, the resource allocation shown in the final step 1906 of FIG. 11 can be derived from the ratios $\{R_i\}$.

Figure 20:
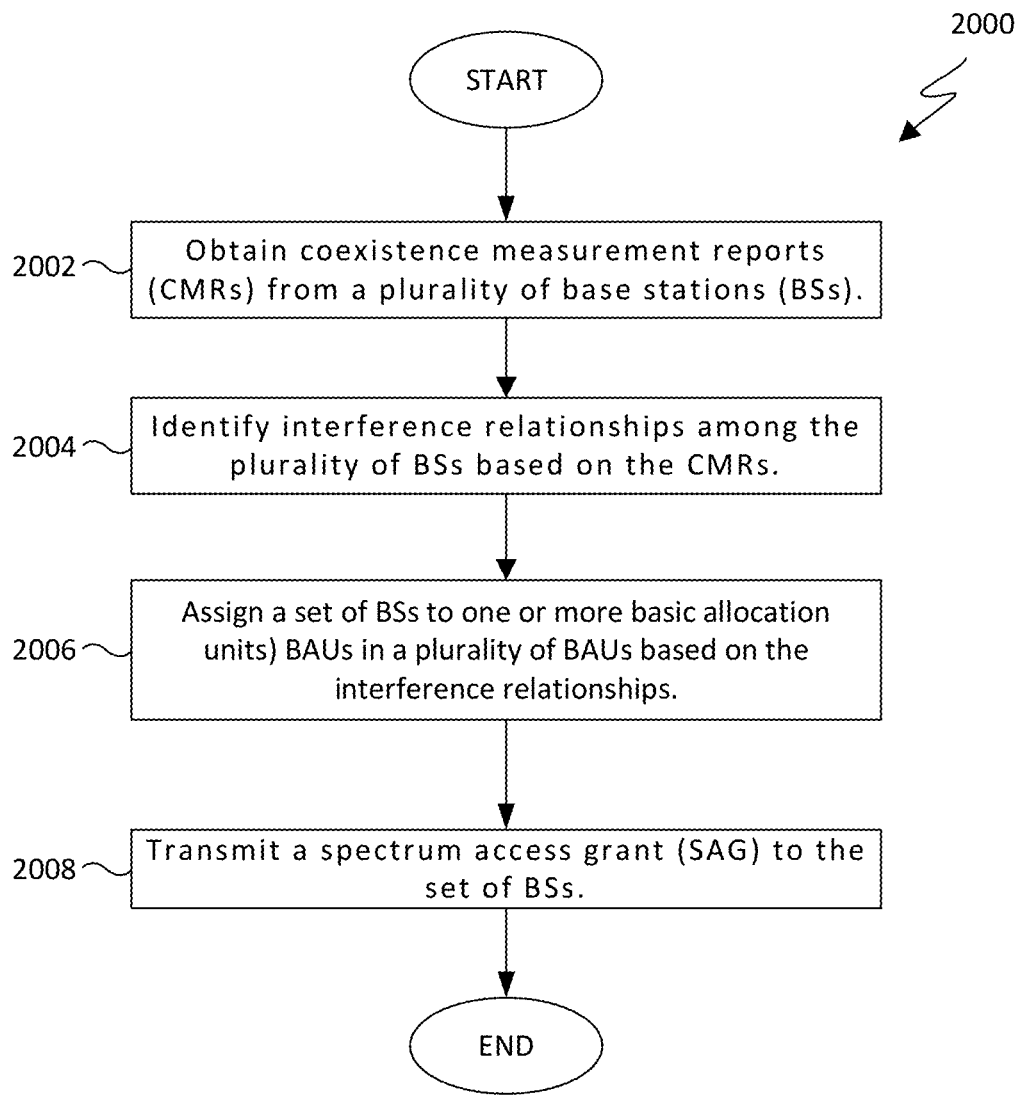
FIG. 20 illustrates a flowchart for managing a shared spectrum according to various embodiments of this disclosure.

FIG. 20 illustrates a flowchart for managing a shared spectrum according to various embodiments of this disclosure. The operations of flowchart 2000 can be implemented in an SSM, such as SSM 406 in FIGS. 4 and 5.

Flowchart 2000 begins at operation 2002 by obtaining coexistence measurement reports (CMRs) from the plurality of BSs. The CMRs may be obtained periodically or aperiodically. In some embodiments, the CMR may be obtained from the plurality of BSs after the SSM sends a CMR request.

In operation 2004, interference relationships are identified among the plurality of BSs based on the CMRs. In one embodiment, interference between BSs is determined based on a threshold power level so that at least some interference between base stations can be tolerated. Interference can be determined as described in operation 1116 in FIG. 11.

In operation 2006, a set of BSs is assigned to one or more basic allocation units (BAUs) in a plurality of BAUs based on the interference relationships. The set of BSs includes a primary BS and a secondary BS, and the secondary BS can transmit in the one or more BAUs when a transmission of the secondary BS does not interfere with a transmission of the primary BS.

In some embodiments, operation 2006 includes assigning the primary BS to a prioritized transmission period in the one or more BAUs, which allows the primary BS to transmit in the prioritized transmission period without performing channel sensing; and assigning the secondary BS to an offset period in the one or more BAUs, which allows the secondary BS to transmit in the offset period after performing channel sensing.

In some embodiments, operation 2006 includes assigning another primary BS to one or more other BAUs in the plurality of BAUs based on the interference relationships. When the other primary BS interferes with the primary BS, the one or more other BAUs is orthogonal to the one or more BAUs.

In some embodiments, operation 2006 also includes assigning a tertiary BS to the one or more BAUs for transmitting in an opportunistic data transmission period (ODTP) in the one or more BAUs. The tertiary BS can transmit in the ODTP after performing a listen-before-talk procedure.

In operation 2008, a spectrum access grant (SAG) is transmitted to the set of BSs, the SAG including BAU assignments for the set of BSs.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device for managing a shared spectrum among a plurality of base stations (BSs), the electronic device comprising:
    memory comprising instructions for managing the shared spectrum; and
    a processor operably connected to the memory, the processor configured to execute the instructions to cause the electronic device to:
        obtain coexistence measurement reports (CMRs) from the plurality of BSs, each CMR including a plurality of information elements that indicate interference relationships between BSs;
        identify interference relationships among the plurality of BSs based on the CMRs;
        assign a set of BSs to one or more basic allocation units (BAUs) in a plurality of BAUs based on the interference relationships, wherein each BAU in the plurality of BAUs is a time/frequency unit, wherein the set of BSs includes a primary BS and a secondary BS, wherein the secondary BS can transmit in a period that is an offset from a start of the one or more BAUs after performing channel sensing for RF energy in a specified period in the one or more BAUs to determine that a transmission of the secondary BS in the one or more BAUs does not interfere with a transmission of the primary BS, and wherein the period is offset according to a predetermined offset; and
        transmit a spectrum access grant (SAG) to the set of BSs, wherein the SAG includes BAU assignments for the set of BSs.

2. The electronic device of claim 1, wherein to assign the set of BSs to the one or more BAUs, the processor is further configured to execute the instructions to:
    assign the primary BS to a prioritized transmission period in the one or more BAUs, wherein the primary BS can transmit in the prioritized transmission period without performing channel sensing; and
    assign the secondary BS to the period that is offset from the start of the one or more BAUs.

3. The electronic device of claim 1, wherein the processor is configured to execute the instructions to further cause the electronic device to:
    assign another primary BS to one or more other BAUs in the plurality of BAUs based on the interference relationships, wherein the other primary BS interferes with the primary BS, and wherein the one or more other BAUs is orthogonal to the one or more BAUs.

4. The electronic device of claim 1, wherein the processor is configured to execute the instructions to further cause the electronic device to:
    assign a tertiary BS to the one or more BAUs for transmitting in an opportunistic data transmission period (ODTP) in the one or more BAUs, wherein the tertiary BS can transmit in the ODTP after performing a listen-before-talk procedure.

5. The electronic device of claim 1, wherein the plurality of information elements includes at least one of a BS identifier, a mobile network operator identifier, a list of neighboring BSs, power levels associated with BSs in the list of neighboring BSs, a list of BSs causing detrimental interference, a transmit power, received signal strength indicator measurements, reference signal receive power measurements, reference signal received quality measurements, load information, channel occupancy measurements, indicators for protected BAUs that are no longer used, indicators for BAU indices experiencing interference, and timestamp data.

6. The electronic device of claim 1, wherein the SAG further includes at least one of a BS identifier, a mobile network operator identifier, an overall frame structure for the shared spectrum, detection threshold function parameters, a maximum allowed transmission power, a contention window size, a protection margin for opportunistic channel access, a synchronization source identifier, BAU allocation for each mobile network, BAU allocation for each BS, transmission opportunity offset assignments, a maximum channel occupancy time, and timestamp data.

7. The electronic device of claim 1, wherein to assign the primary BS to the one or more BAUs in the plurality of BAUs based on the interference relationships, the processor is configured to execute the instructions to further cause the electronic device to:
    generate an interference graph that represents each BS in the plurality of BSs as a vertex with one or more of the interference relationships identified by edges between vertices;
    for each vertex, compute a resource reservation ratio based on vertex priority and a number of connected components; and
    assign the primary BS to the one or more BAUs based on the resource reservation ratio.

8. A base station (BS) comprising:
    a transceiver configured to:
        transmit a coexistence measurement report (CMR) to a shared spectrum manager (SSM), wherein the CMR includes plurality of information elements that indicate interference relationships between the BS and neighboring BSs;
        receive a spectrum access grant (SAG) originating from the SSM, wherein the SAG includes a set of assignments for one or more basic allocation units (BAUs) for the BS, wherein each of the one or more BAUs is a time/frequency unit, wherein the set of assignments indicates that the BS is a secondary BS that can transmit in a period that is an offset from a start of the one or more BAUs after performing channel sensing for RF energy in a specified period in the one or more BAUs to determine that a transmission of the secondary BS in the one or more BAUs does not interfere with a transmission of a primary BS assigned to the one or more BAUs, and wherein the period is offset according to a predetermined offset; and
    a processor operably connected to the transceiver, the processor configured to:
        generate the CMR; and
        identify transmission opportunities (TXOPs) for the BS to transmit data based on the set of assignments for the one or more BAUs.

9. The BS of claim 8, wherein: the SAG indicates an assignment to the BS of the period that is offset from the start of the one or more BAUs,
    to identify the TXOPs for the BS, the processor is further configured to perform channel sensing prior to the period that is offset and in the one or more BAUs, and
    the transceiver is further configured to transmit the data in the period that is offset after performance of the channel sensing.

10. The BS of claim 8, wherein when another primary BS is assigned to one or more other BAUs and when the other primary BS interferes with the primary BS, the one or more other BAUs is orthogonal to the one or more BAUs.

11. The BS of claim 8, wherein the BS is assigned to transmit in an opportunistic data transmission period (ODTP) in the one or more BAUs after performing a listen-before-talk procedure.

12. The BS of claim 8, wherein the plurality of information elements includes at least one of a BS identifier, a mobile network operator identifier, a list of neighboring BSs, power levels associated with BSs in the list of neighboring BSs, a list of BSs causing detrimental interference, a transmit power, received signal strength indicator measurements, reference signal receive power measurements, reference signal received quality measurements, load information, channel occupancy measurements, indicators for protected BAUs that are no longer used, indicators for BAU indices experiencing interference, and timestamp data.

13. The BS of claim 8, wherein the SAG further includes at least one of a BS identifier, a mobile network operator identifier, an overall frame structure for the shared spectrum, detection threshold function parameters, a maximum allowed transmission power, a contention window size, a protection margin for opportunistic channel access, a synchronization source identifier, BAU allocation for each mobile network, BAU allocation for each BS, transmission opportunity offset assignments, a maximum channel occupancy time, and timestamp data.

14. The BS of claim 8, wherein:
the BS is assigned to the one or more BAUs in a shared spectrum based on an interference graph that represents each BS in a plurality of BSs of the shared spectrum as a vertex with one or more of the interference relationships identified by edges between vertices, and
each vertex is associated with a resource reservation ratio based on vertex priority and a number of connected components.

15. A method for managing a shared spectrum among a plurality of BSs, the method comprising:
obtaining coexistence measurement reports (CMRs) from the plurality of BSs, each CMR including a plurality of information elements that indicate interference relationships between BSs;
identifying interference relationships among the plurality of BSs based on the CMRs;
assigning a set of BSs to one or more (basic allocation units) BAUs in a plurality of BAUs based on the interference relationships, wherein each BAU in the plurality of BAUs is a time/frequency unit, wherein the set of BSs includes a primary BS and a secondary BS, wherein the secondary BS can transmit in a period that is an offset from a start of the one or more BAUs after performing channel sensing for RF energy in a specified period in the one or more BAUs to determine that a transmission of the secondary BS in the one or more BAUs does not interfere with a transmission of the primary BS, and wherein the period is offset according to a predetermined offset; and
transmitting a spectrum access grant (SAG) to the set of BSs, wherein the SAG includes BAU assignments for the set of BSs.

16. The method of claim 15, wherein assigning the set of BSs to the one or more BAUs further comprises:
assigning the primary BS to a prioritized transmission period in the one or more BAUs, wherein the primary BS can transmit in the prioritized transmission period without performing channel sensing; and
assigning the secondary BS to the period that is offset from the start of the one or more BAUs.

17. The method of claim 15, further comprising:
assigning another primary BS to one or more other BAUs in the plurality of BAUs based on the interference relationships, wherein the other primary BS interferes with the primary BS, and wherein the one or more other BAUs is orthogonal to the one or more BAUs.

18. The method of claim 15, further comprising:
assigning a tertiary BS to the one or more BAUs for transmitting in an opportunistic data transmission period (ODTP) in the one or more BAUs, wherein the tertiary BS can transmit in the ODTP after performing a listen-before-talk procedure.

19. The method of claim 15, wherein the plurality of information elements include at least one of a BS identifier, a mobile network operator identifier, a list of neighboring BSs, power levels associated with BSs in the list of neighboring BSs, a list of BSs causing detrimental interference, a transmit power, received signal strength indicator measurements, reference signal receive power measurements, reference signal received quality measurements, load information, channel occupancy measurements, indicators for protected BAUs that are no longer used, indicators for BAU indices experiencing interference, and timestamp data.

20. The method of claim 15, wherein the SAG further includes at least one of a BS identifier, a mobile network operator identifier, an overall frame structure for the shared spectrum, detection threshold function parameters, a maximum allowed transmission power, a contention window size, a protection margin for opportunistic channel access, a synchronization source identifier, BAU allocation for each mobile network, BAU allocation for each BS, transmission opportunity offset assignments, a maximum channel occupancy time, and timestamp data.

* * * * *